(12) United States Patent
Haartsen et al.

(10) Patent No.: US 8,351,437 B2
(45) Date of Patent: Jan. 8, 2013

(54) STEREO BIT CLOCK TUNING

(75) Inventors: Jacobus Cornelis Haartsen, Hardenberg (NL); Geert Hendrik Weinans, Klijndijk (NL); Dick De Jong, Emmen (NL)

(73) Assignee: Sony Mobile Communications AB, Lund (SE)

( * ) Notice: Subject to any disclaimer, the term of this patent is extended or adjusted under 35 U.S.C. 154(b) by 511 days.

(21) Appl. No.: 12/616,959

(22) Filed: Nov. 12, 2009

(65) Prior Publication Data

US 2011/0110358 A1 May 12, 2011

(51) Int. Cl.
*H04J 3/06* (2006.01)
*H04L 7/00* (2006.01)
(52) U.S. Cl. .................. 370/395.62; 370/503; 370/535; 375/356; 375/359
(58) Field of Classification Search .................. 370/466, 370/474, 395.64, 535, 467, 395.62, 503, 370/516, 518–519; 375/356, 359
See application file for complete search history.

(56) References Cited

U.S. PATENT DOCUMENTS

| 7,248,590 | B1 * | 7/2007 | Liu | 370/395.64 |
| 7,974,578 | B2 * | 7/2011 | Lin | 455/41.2 |
| 2008/0126825 | A1 * | 5/2008 | Yang | 713/600 |
| 2010/0272102 | A1 * | 10/2010 | Kobayashi | 370/389 |

FOREIGN PATENT DOCUMENTS

GB  2 454 493 A  5/2009

OTHER PUBLICATIONS

Utility U.S. Appl. No. 12/169,848, filed Jul. 9, 2008 entitled "Apparatus and Methods for Time Synchronization of Wireless Audio Data Streams", pp. 1-29, pending from U.S. Appl. No. 61/056,129, filed May 27, 2008.
Notification of Transmittal of the International Search Report and the Written Opinion of the International Searching Authority, or the Declaration corresponding to PCT/IB2010/054393, mailed Feb. 4, 2011, 10 pages.
International Preliminary Report on Patentability; Apr. 13, 2011; issued in International Patent Application No. PCT/IB2010/054393.

* cited by examiner

*Primary Examiner* — Habte Mered
(74) *Attorney, Agent, or Firm* — Sreenivas Vedantam; Moore & Van Allen PLLC

(57) ABSTRACT

A source communication device includes a source network clock to control timing of communicating with other devices in a network, a source streaming clock associated with processing of audio or video data, a time stamp generator to generate a time stamp that includes a source network clock value and a source streaming clock value, and a time stamp insertion mechanism that incorporates the time stamp into a data unit that is to be transmitted to one of the other devices in the network. A sink communication device includes a sink network clock synchronized with the source network clock, a sink streaming clock associated with processing of audio or video data, and a sink time stamp mechanism to compare a sink streaming clock value with the source streaming clock value, and adjust the sink streaming clock based on the comparison.

20 Claims, 15 Drawing Sheets

STEREO BIT CLOCK TUNING

BACKGROUND

Wireless communication between electronic devices is widespread and has many applications. Electronic devices may communicate wirelessly with each other using Bluetooth technology. Bluetooth technology allows low power, short range communication between multiple electronic devices, and may be used to exchange data, or audio or video signals. One application of Bluetooth technology may include the distribution of real-time audio or video signals from one electronic device to one or more other electronic devices. Maintaining the real-time nature of distribution of audio signals may prove to be particularly troublesome.

SUMMARY

According to one aspect, a system may include a source communication device comprising a memory to store instructions; and a processor to execute the instructions to implement a source network clock to control timing of events associated with communicating with other devices in a network; a source streaming clock associated with processing of audio or video data; a time stamp generator to generate a time stamp that includes a source network clock value derived from the source network clock and a source streaming clock value derived from the source streaming clock; and a time stamp insertion mechanism that incorporates the time stamp into a data unit; and a communication interface to transmit the data unit to one of the other devices in the network.

Additionally, the processor may further implement a sink signal analyzer to receive information from a sink communication device and to activate the time stamp generator based on the received information.

Additionally, the sink signal analyzer may receive a sink time stamp from a sink communication device and the time stamp generator may generate a virtual time stamp based on the received sink time stamp.

Additionally, the time stamp mechanism may extrapolate the time stamp based on a future source network clock value.

Additionally, the time stamp mechanism may provide, in the time stamp, an indication of when a subsequent time stamp will be generated in the future.

Additionally, the device may include a sink communication device that includes a memory to store instructions; and a processor to execute the instructions to implement a sink network clock synchronized with the source network clock; a sink streaming clock associated with processing of audio or video data; and a sink time stamp mechanism to receive the time stamp from the source communication device; compare a sink streaming clock value derived from the sink streaming clock with the source streaming clock value included in the time stamp; and adjust the sink streaming clock based on the comparison.

Additionally, the device may include a derivation mechanism to derive the sink streaming clock from the sink network clock by implementing a multiplication factor, and where the sink time stamp mechanism adjusts the derivation mechanism by adjusting the multiplication factor based on the comparison of the sink streaming clock value with the source streaming clock value.

Additionally, the sink time stamp mechanism may further receive, from the source device, an indication of when a next time stamp will be generated; and generate a sink time stamp based on the received indication.

Additionally, the sink time stamp mechanism may generate sink time stamps at particular intervals.

Additionally, the network may include a Bluetooth piconet, the source network clock and the sink network clock may include a Bluetooth piconet clock, and the source streaming clock and the sink streaming clock may include a pulse code modulation (PCM) clock.

According to another aspect, a method may include recording, using a baseband controller of a source communication device, a source network clock value associated with a source network clock that controls timing of communication in a network; recording, using the baseband controller, a source streaming clock value associated with a source streaming clock associated with processing of audio or video data in the source communication device; generating, using the baseband controller, a time stamp that includes the source network clock value and the source streaming clock value; and sending, using the baseband controller, the time stamp to a sink communication device.

Additionally, the generating may include extrapolating the source network clock value and the source streaming clock value based on a future source network clock value.

Additionally, the generating may include including, in the time stamp, an indication of when a subsequent time stamp will be generated.

Additionally, the generating may include receiving, from the sink communication device, a sink time stamp and generating a virtual time stamp based on the received sink time stamp.

Additionally, the method may include receiving, using a baseband controller of the sink communication device, the time stamp; comparing, using the baseband controller of the sink communication device, the source streaming clock value with a sink streaming clock value associated with a sink streaming clock associated with processing of audio or video data in the sink communication device; and adjusting, using the baseband controller of the sink communication device, the sink streaming clock based on a result of the comparison.

Additionally, the comparing may include detecting that a sink network clock reached a value matching the source network clock value included in the time stamp; and in response to the detecting, comparing the source streaming clock value included in the time stamp with the sink streaming clock value.

Additionally, the comparing may include retrieving a sink time stamp that includes a sink network clock value matching the source network clock value, where the sink time stamp includes the sink streaming clock value.

Additionally, the adjusting may include adjusting a multiplication factor used to derive the sink streaming clock from a sink network clock based on a result of the comparison.

Additionally, the method may include monitoring a buffer associated with output of audio or video data; and sending a sink signal to the source communication device, where the sink signal includes information about the status of the buffer.

According to another aspect, a system may include a source communication device comprising a first memory device containing instructions executable by a first processor, the first memory device comprising one or more instructions to provide a source network clock to control timing of events associated with communicating with other devices in a network; one or more instructions to provide a source streaming clock associated with processing of audio or video data; one or more instructions to generate a time stamp that includes a source network clock value derived from the source network clock and a source streaming clock value derived from the source streaming clock; and one or more instructions to incorporate the time stamp into a data unit and transmit the data unit to one of the other devices in the network; and a sink communication device comprising a second memory device containing instructions executable by a second processor, the second memory device comprising one or more instructions to provide a sink network clock synchronized with the source network clock; one or more instructions to provide a sink streaming clock associated with processing of audio or video data; one or more instructions to receive the data unit and extract the time stamp from the data unit; one or more instructions to compare a sink streaming clock value to the source streaming clock value; and one or more instructions to adjust the sink streaming clock based on the comparison.

BRIEF DESCRIPTION OF THE DRAWINGS

The accompanying drawings, which are incorporated in and constitute a part of this specification, illustrate one or more systems and/or methods described herein and, together with the description, explain these systems and/or methods. In the drawings.

DETAILED DESCRIPTION

Figure 1:
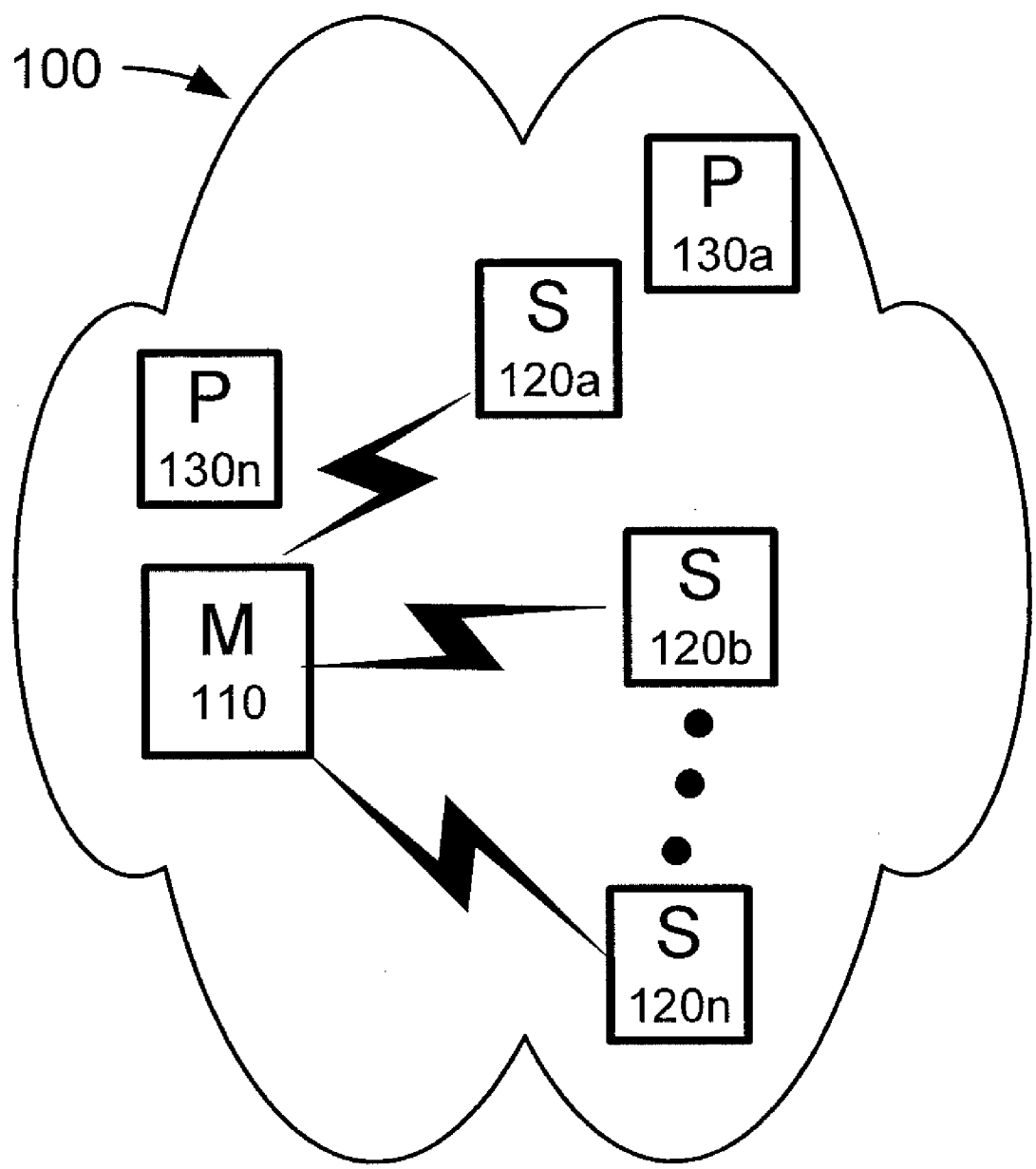
FIG. 1 is a diagram of an exemplary network according to an implementation described herein.

The following detailed description refers to the accompanying drawings. The same reference numbers in different drawings identify the same or similar elements. Also, the following detailed description does not limit the invention.

Exemplary implementations described herein may relate to synchronizing clocks between electronic devices in a wireless network, such as a wireless network established between devices using Bluetooth technology. Wireless distribution of audio (or video signals) from a single source to multiple sinks may put special requirements on the timing at which an audio signal is sampled, because the human ear may be sensitive to phase variations within an audio signal. A fixed phase difference between two sinks that are outputting an audio signal may affect the direction from which a user experiences the sound signal. For example, a phase difference that varies over time may have a detrimental effect on music experience (e.g., may cause a nauseating effect).

If the sink devices that are outputting an audio signal are placed at a sufficiently far distance from the ears of the user (e.g., a few meters for audio speakers), a delay difference between audio signals coming from two different sink devices may be a few milliseconds (ms). For example, 3 ms may cover 150 audio samples at a sampling frequency of 44.1 kilohertz (kHz) and may correspond to a sound propagation distance of 1 m. However, if the sink devices are a left earpiece and a right earpiece of a headset, the delay difference may need to be limited to 100 microseconds ($\mu s$). For example, 5 audio samples at a sampling frequency of 44.1 kHz may correspond to a sound propagation distance of 1 cm. Thus, for example, a separate left and right channel in headset applications may require accurate timing in a left and a right earpiece to avoid the phase variation effects described above. Synchronization of audio streams in both channels may therefore be necessary.

Transmission of information in a wireless network, such as a wireless network that uses Bluetooth technology, may be synchronized based on a network clock. For example, in a Bluetooth network (also known as a piconet), the network clock may be referred to as a Bluetooth clock (or as a piconet clock). A source device that sends information to one or more sink devices may provide a central network clock that synchronizes network activity, such as frequency hopping and transmission of packets. The central network clock may be continuously updated at the sink devices based on information provided by the source device. For example, the source device may provide network clock information with each packet transmission. Thus, the network clocks of the sink devices may be synchronized with the network clock of the source device.

Streaming of real-time audio (or video) information may be controlled by a streaming clock. For example, in devices using pulse-code modulation (PCM), the streaming clock may be referred to as a PCM clock. The streaming clock may control the rate of sampling of audio information, such as a rate at which to output audio information from a buffer to an output device, such as a speaker. When the streaming clock in a source device differs from the streaming clock in sink devices, buffer overflow or underflow may result. Buffer overflow or underflow may result in interruption of a user's listening experience.

Buffer flow problems may be solved using bit clock tuning. In bit clock tuning, the streaming clock in sink devices may be slowly adapted based on buffer content to prevent buffer overflow or underflow. However, in the case of separate left and right channels, such as with left and right earpieces of a wireless headset, independent bit clock tuning may not be applicable, because such independent tuning of the streaming clocks in the sink devices may disturb the strict timing alignment between the two channels.

In order to synchronize streaming of audio information in the sink devices, the streaming clock in the sink devices may be derived from the network clock. Application Ser. No. 12/169,848 filed Jul. 9, 2008, entitled "Apparatus and Methods for Time Synchronization of Wireless Audio Data Streams" presents a method to synchronize independent Bluetooth channels by locking pulse-code modulation (PCM) clocks (i.e. the streaming clocks) in sink devices to a Bluetooth piconet clock (i.e., the network clock), which may be continuously aligned, at each new packet arrival, to a master piconet clock in a source device. In many cases, the network clock in the source device and the streaming clock in the source device may be derived from the same crystal oscillator in the source device. Therefore, the streaming clock of the source device and the streaming clocks of the sink devices may both be derived from the network clock. In such situations, the streaming clock of the source device and the streaming clocks of the sink devices may be automatically aligned.

However, the streaming clock of the source device may be independent of the network clock. For example, the streaming clock of the source device may be derived from an external source (e.g., received across a network connection). Therefore, the streaming clock in the source device may not be synchronized with the network clock, and thus the streaming clock in the source device may not be synchronized with the streaming clock of the sink devices. In such situations, locking the streaming clocks in the sink devices to the network clock may not be sufficient.

Implementations described herein relate to providing a time stamp from the source device to the sink devices at periodic intervals. The time stamp provides a value associated with a streaming clock of the source device at a particular value associated with the network clock. When the sink devices receive the time stamp, the sink devices may compare values associated with streaming clock clocks in the sink devices with the streaming clock value of the source device, at the specified network clock counter value. If the value of the streaming clock of a sink device differs from the value of the streaming clock of the source device, the streaming clock of the sink device is adjusted to align the streaming clock of the sink device with the streaming clock of the source device.

When a time stamp is generated in the source device, by the time that the time stamp reaches the sink devices, the network clocks of the sink devices may have passed the network clock value at which the time stamp was generated in the source device. Implementations described herein may take this into account by providing a time stamp that is extrapolated into the future; by providing information to sink devices about when the next time stamp will be generated; or by generating periodic sink time stamps at particular intervals in the sink devices, and comparing a particular sink time stamp with a received time stamp.

In some situations, a source device may not be able to generate a time stamp, such as when packets for an audio stream from an external source arrive at irregular intervals. Implementations described herein may relate to receiving, by a source device, time stamps from sink devices, along with the status of buffers of the sink devices, and generating, in the source device, virtual time stamps based on the received sink information.

Exemplary Network

FIG. 1 is a diagram of a exemplary network 100 according to an implementation described herein. Network 100 may be a wireless network, such as a piconet formed between devices using Bluetooth technology. Network 100 may form spontaneously whenever one or more devices, with enabled Bluetooth technology, come within a particular range of each other. Network 100 may be defined by a unique channel, represented by a pseudo-random frequency hopping sequence. The channel may be divided into time slots, and devices of the network may take turns transmitting on a particular frequency based on the time slots and based on the frequency hopping sequence. A network clock may number the time slots and may determine the timing of the frequency hopping sequence.

Network 100 may include a master device 110, one or more slave devices 120a-120n, and one or more parked devices 130a-n. Master device 110, slave devices 120a-120n, and parked devices 130 may include any electronic devices with a communication function (e.g., enabled with Bluetooth technology), such as, for example, a media playing device with wireless communication capabilities, such as an audio system, a speaker, an earpiece, or a headset with multiple earpieces; a desktop computing device, such as a personal computer or a workstation; a laptop or palmtop computer; a mobile telephone or a personal communications system (PCS) terminal that may combine a cellular radiotelephone with data processing, facsimile and data communications capabilities; a personal digital assistant (PDA) or smart phone that may include a radiotelephone, pager, Internet/Intranet access, Web browser, organizer, calendar and/or a global positioning system (GPS) receiver; a networking device, such as a router, switch, firewall, or a gateway; a telephone terminal; a printer; a camera or video recorder; a microphone; or any other electronic device with a wireless communication function, or combinations thereof.

Master device 110 may initiate formation of network 100, may control information transfer in network 100, and may set the frequency hopping sequence and control the network clock. Master device 110 may communicate with any of slave devices 120a-120n. Slave devices 120a-120n may communicate with master device 110 and may actively participate in traffic of network 100. Slave devices 120a-120n may receive network clock information from master device 110. Parked devices 130a-n may be synchronized to network 100 without participating in network traffic. Parked devices 130a-n may remain in low power mode and may occasionally listen to traffic from master device 110 to remain synchronized to network 100.

Although FIG. 1 shows exemplary components of network 100, in other implementations, network 100 may contain fewer, different, additional, or differently arranged devices than depicted in FIG. 1. In still other implementations, one or more devices of network 100 may perform one or more other tasks described as being performed by one or more other devices of network 100.

Figure 2A:
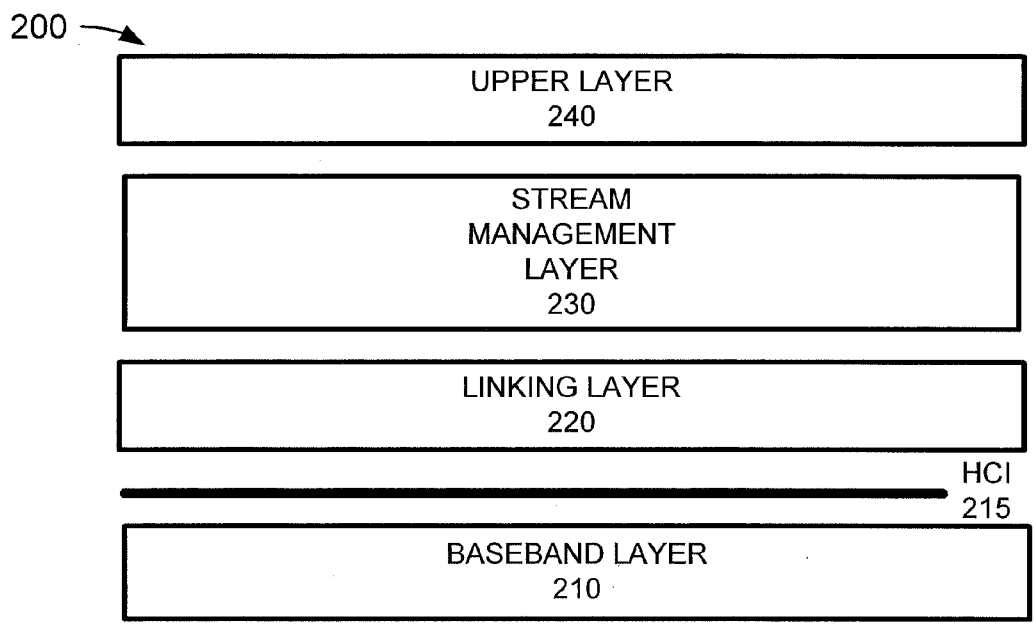
FIG. 2A is a diagram of an exemplary protocol stack associated with the network of FIG. 1.
Figure 2B:
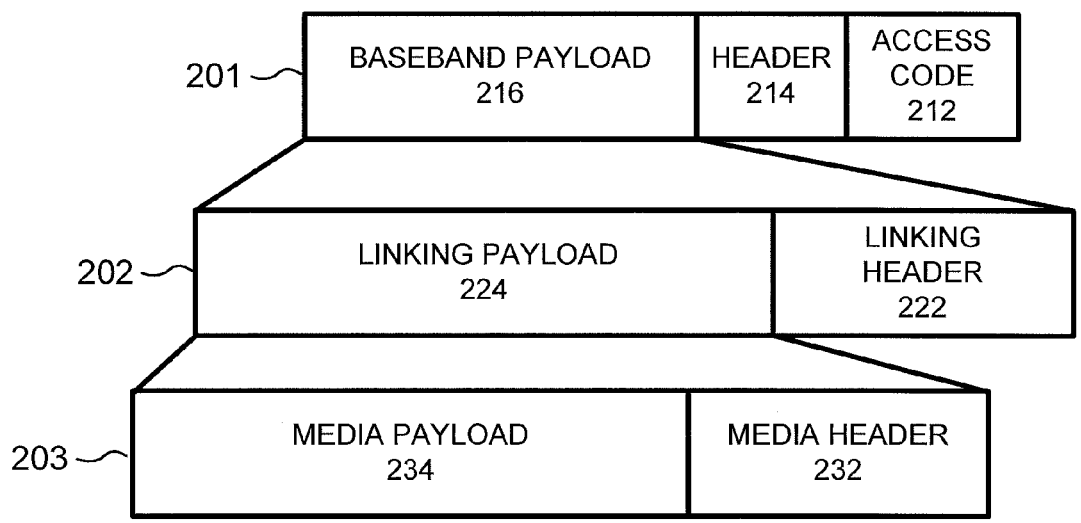
FIG. 2B is a diagram of an exemplary data unit associated with the protocol stack of FIG. 2A.

FIG. 2A is a diagram of an exemplary protocol stack 200 that may be associated with the network of FIG. 1. FIG. 2B is a diagram of an exemplary data unit associated with the protocol stack of FIG. 2A. Protocol stack 200 may include a baseband layer protocol 210, a host controller interface 215, a linking layer protocol 220, a stream management protocol 230, and an upper layer protocol 240.

Baseband layer protocol 210 may include the physical layer of network 100 and may be implemented by a baseband controller of a device of network 100. Baseband layer protocol 210 may provide establishment of connections and power control between devices in network 100. Baseband layer protocol 210 may manage a frequency hopping sequence and divide a channel of network 100 into time slots based on the network clock of network 100. In a Bluetooth protocol stack, baseband layer protocol 210 may lay on top of a Bluetooth radio layer.

Baseband layer protocol 210 may receive information from upper layers and partition the information into baseband packets 201 (FIG. 2B). Baseband packet 201 may include a baseband payload 216, a header 214, and an access code 212. Baseband payload 216 may include a packet, or part of a packet, received from an upper layer, such as linking layer 220. Header 214 may include information for acknowledgement of packet 201, a numbering of packet 201 in a sequence of packets, an error checking value, and a destination address of a device of network 100 to which packet 201 is to be delivered. Access code 212 may include a code that identifies network 100, network clock information that may be used for timing synchronization of packets, and information used to adjust radio parameters, such as frequency and phase in the receiving device.

Host controller interface 215 may provide standardized communication between a host protocol stack (i.e. upper layer protocols) and baseband layer protocol 210. Use of host controller interface 215 may allow modularity between a baseband controller and a host controller. For example, a standard Bluetooth controller integrated circuit (IC) chip may be interchangeably used with various devices when host controller interface 215 is implemented.

Linking layer protocol 220 may be layered over baseband layer protocol 210 and may provide connection service to upper layer services. Linking layer protocol 220 may provide multiplexing capability, data unit segmentation and reassembly operations, or establishment of virtual channels between devices in network 100. In a Bluetooth protocol stack, linking layer 220 may be implemented, for example, as a logical link control and adaptation protocol (L2CAP).

Linking layer protocol 220 may receive information from upper layers and partition the information into linking packets 202 (FIG. 2B). Linking packet 202 may include a linking payload 224 and a linking header 222. Linking payload 224 may include a packet, or part of a packet, received from an upper layer, such as stream management layer protocol 230. Linking header 222 may include a channel identifier. Linking packet 202 may be significantly longer than a baseband packet 201 and may therefore need to be broken up into several segments and sent as a series of baseband packets.

Stream management layer protocol 230 may be layered over linking layer protocol 220 and may receive real-time information, such as an audio or video stream, from an upper layer. Stream management layer protocol 230 may provide establishment, configuration, recovery, and control of audio or video streams. A particular audio or video stream may be established over a particular linking layer channel. In a particular implementation of a Bluetooth protocol stack, stream management layer protocol 230 may be implemented, for example, as an audio/video distribution transfer protocol (AVDTP).

Stream management layer protocol 230 may receive audio or video stream information from upper layer protocol 240 and partition the information into media packets 203 (FIG. 2B). A media packet 203 may include a media payload 234 and a media header 232. Media payload 234 may include audio or video stream data received from upper layer protocol 240, or control information associated with an audio or video stream. Media header 232 may include information associated with data in media payload 234, such as, for example, whether media payload 234 includes data or control information, a packet number associated with media packet 203, and a source of information included in media payload 234.

Upper layer protocol 240 may include protocols associated with one or more applications running on a device of network 100. For example, upper layer protocol 240 may include a media player application.

Assume an application, such as a media player, in master device 110 needs to send information to an application, such as a media player, in slave device 120a. The application, which may be part of upper layer protocol 240, may generate an audio stream based on a streaming clock based in master device 110, and provide the audio stream information to stream management layer protocol 230. Stream management layer protocol 230 may create media packet 203 and provide media packet 203 to linking layer protocol 220. Linking layer protocol 220 may establish a channel, create linking packet 202, and provide linking packet 202 to baseband layer protocol 210 via host controller interface 215. Baseband layer protocol 210 may create baseband packet 201 (possibly breaking up linking packet 202 into multiple baseband packets 201) and provide baseband packet 201 to a radio frequency (RF) transmitter of master device 110 based on a network clock of network 100. Header 214 of baseband packet 201 may include the destination address of slave device 120a. The RF transmitter, of master device 110, may broadcast baseband packet 201 on network 100.

An RF receiver, of slave device 120a, may receive baseband packet 201, and a baseband controller of slave device 120a may decode header 214 and determine that baseband packet 201 is intended for slave device 120a. Baseband layer protocol 210 may extract linking packet 202 from baseband packet 201 and provide linking packet 202 to linking protocol 220 of slave device 120a. Linking protocol 220 may identify a channel based on information in linking header 222, and determine that linking packet 202 includes media packet 203. Linking protocol 220, of slave device 120a, may then provide the extracted media packet 203 to stream management layer 230 of slave device 120a. Stream management layer protocol 230, of slave device 120a, may determine a particular stream based on information in media header 232, and provide the data from media payload 234 to an application associated with upper layer protocol 240 (i.e. a media player application) of slave device 120a. The media player application of slave device 120a may output the data from media payload 234 based on a streaming clock based in slave device 120a.

Although FIG. 2A shows exemplary components of protocol stack 200, in other implementations, protocol stack 200 may contain fewer, different, additional, or differently arranged protocol layers than depicted in FIG. 2A. In still other implementations, one or more protocols of protocol stack 200 may perform one or more other tasks described as being performed by one or more other protocols of protocol stack 200.

Although FIG. 2B shows exemplary components of baseband packet 201, in other implementations, baseband packet 201 may contain fewer, different, additional, or differently arranged data items than depicted in FIG. 2B. In still other implementations, one or more data items of baseband packet 201 may include information described as being included in one or more other data items of baseband packet 201.

Exemplary Devices

Figure 3:
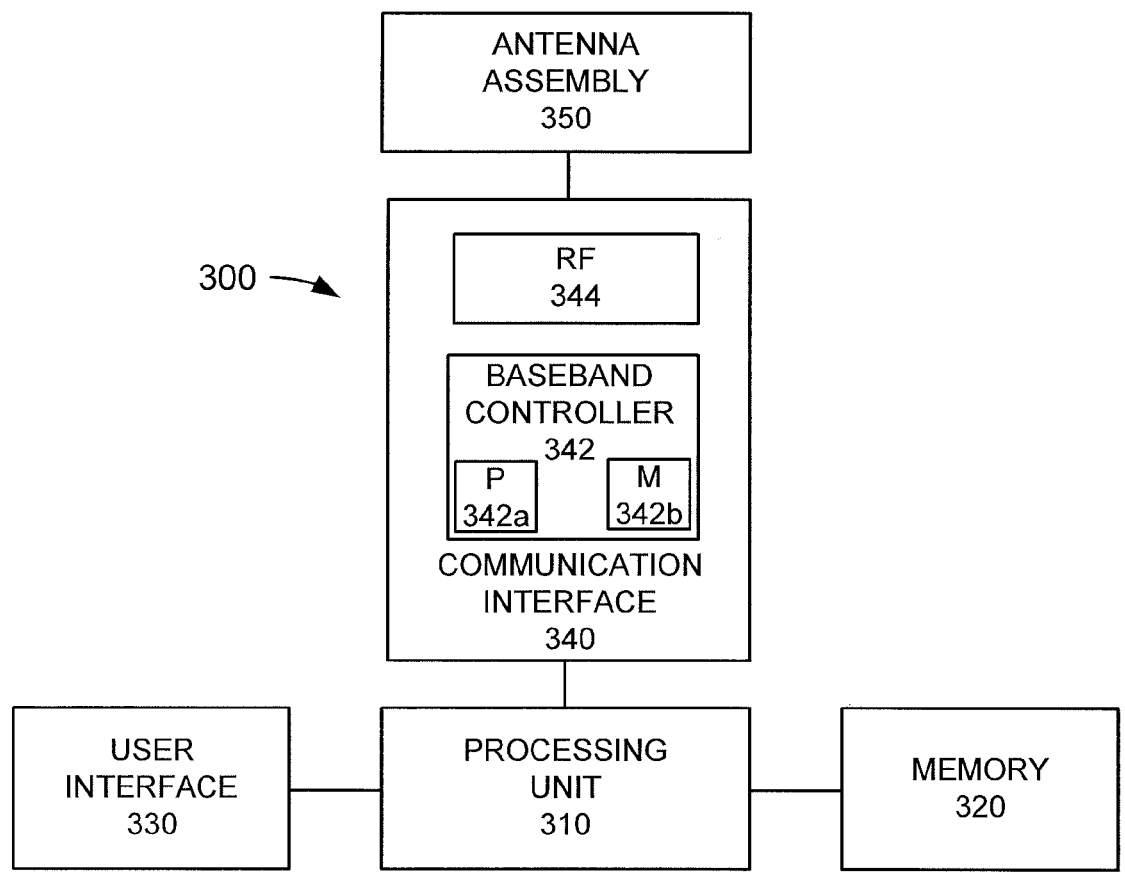
FIG. 3 is a diagram illustrating exemplary components of one of the devices of the network of FIG. 1.

FIG. 3 is a diagram illustrating exemplary components of communication device 300 of network 100 of FIG. 1. Communication device 300 may represent master device 110, any of slave devices 120a-120n, or any of parked devices 130a-130n. As shown in FIG. 3, communication device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), or other types of processors that may interpret and execute instructions, programs, or data structures. Processing unit 310 may control operation of communication device 300 and its components.

Memory 320 may include a random access memory (RAM) or another type of dynamic storage device that may store information and/or instructions for execution by processing unit 310; a read only memory (ROM) or another type of static storage device that may store static information and/or instructions for use by processing unit 310; a flash memory (e.g., an electrically erasable programmable read only memory (EEPROM)) device for storing information and/or instructions; and/or some other type of magnetic or optical recording medium and its corresponding drive.

User interface 330 may include mechanisms for inputting information to communication device 300 and/or for outputting information from communication device 300. Examples of input and output mechanisms might include a speaker to receive electrical signals and output audio signals; a camera lens to receive image and/or video signals and output electrical signals; a microphone to receive audio signals and output electrical signals; buttons (e.g., a joystick, control buttons, or keys of a keypad) to permit data and control commands to be input into communication device 300; a display (e.g., a touch screen) to output visual information; and/or a vibrator to cause communication device 300 to vibrate.

Communication interface 340 may include any transceiver-like mechanism that enables communication device 300 to communicate with other devices and/or systems. For example, communication interface 340 may include a modem or an Ethernet interface to a local area network (LAN). In one implementation, for example, communication interface 340 may communicate with a network (e.g., a local area network (LAN), a wide area network (WAN), a telephone network, such as the Public Switched Telephone Network (PSTN), an intranet, the Internet, or a combination of networks).

Communication interface 340 may also include mechanisms for communicating via a wireless network. For example, communication interface 340 may include baseband controller 342 and radio frequency (RF) transceiver 344.

Baseband controller 342 may implement baseband layer protocol 210 and may provide host control interface 215 for communicating with processing unit 310. Baseband controller 342 may be part of communication interface 340 or may be a separate integrated circuit. Baseband controller 342 may include a baseband processor 342a and a baseband memory 342b.

Baseband processor 342a may include one or more processors, microprocessors, ASIC, FPGA, or other types of processors that may interpret and execute instructions, programs, or data structures. Baseband processor 342a may control operation of baseband controller 342 and its components.

Baseband memory 342b may include a RAM or another type of dynamic storage device that may store information and/or instructions for execution by baseband processor 342a; a ROM or another type of static storage device that may store static information and/or instructions for use by baseband processor 342a; a flash memory (e.g., an electrically erasable programmable read only memory (EEPROM)) device for storing information and/or instructions; and/or some other type of magnetic or optical recording medium and its corresponding drive.

RF transceiver 344 may include a transmitter that may convert baseband signals from baseband controller 342 to radio frequency (RF) signals and/or a receiver that may convert RF signals to baseband signals. Alternatively, RF transceiver 344 may include a transceiver to perform functions of both a transmitter and a receiver. RF transceiver 344 may connect to antenna assembly 350 for transmission and/or reception of the RF signals.

Antenna assembly 350 may include one or more antennas to transmit and/or receive RF signals over the air. Antenna assembly 350 may, for example, receive RF signals from RF transceiver 344 and transmit them over the air and receive RF signals over the air and provide them to RF transceiver 344.

As described herein, communication device 300 may perform certain operations in response to processing unit 310 (and/or baseband processor 342a) executing software instructions contained in a computer-readable medium, such as memory 320 (and/or baseband memory 342b). A computer-readable medium may be defined as a physical or logical memory device. A logical memory device may include memory space within a single physical memory device or spread across multiple physical memory devices. The software instructions may be read into memory 320 (and/or baseband memory 342b) from another computer-readable medium or from another device via communication interface 340. The software instructions contained in memory 320 (and/or baseband memory 342b) may cause processing unit 310 (and/or baseband processor 342a) to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of communication device 300, in other implementations, communication device 300 may contain fewer, different, additional, or differently arranged components than depicted in FIG. 3. In still other implementations, one or more components of communication device 300 may perform one or more other tasks described as being performed by one or more other components of communication device 300.

Figure 4:
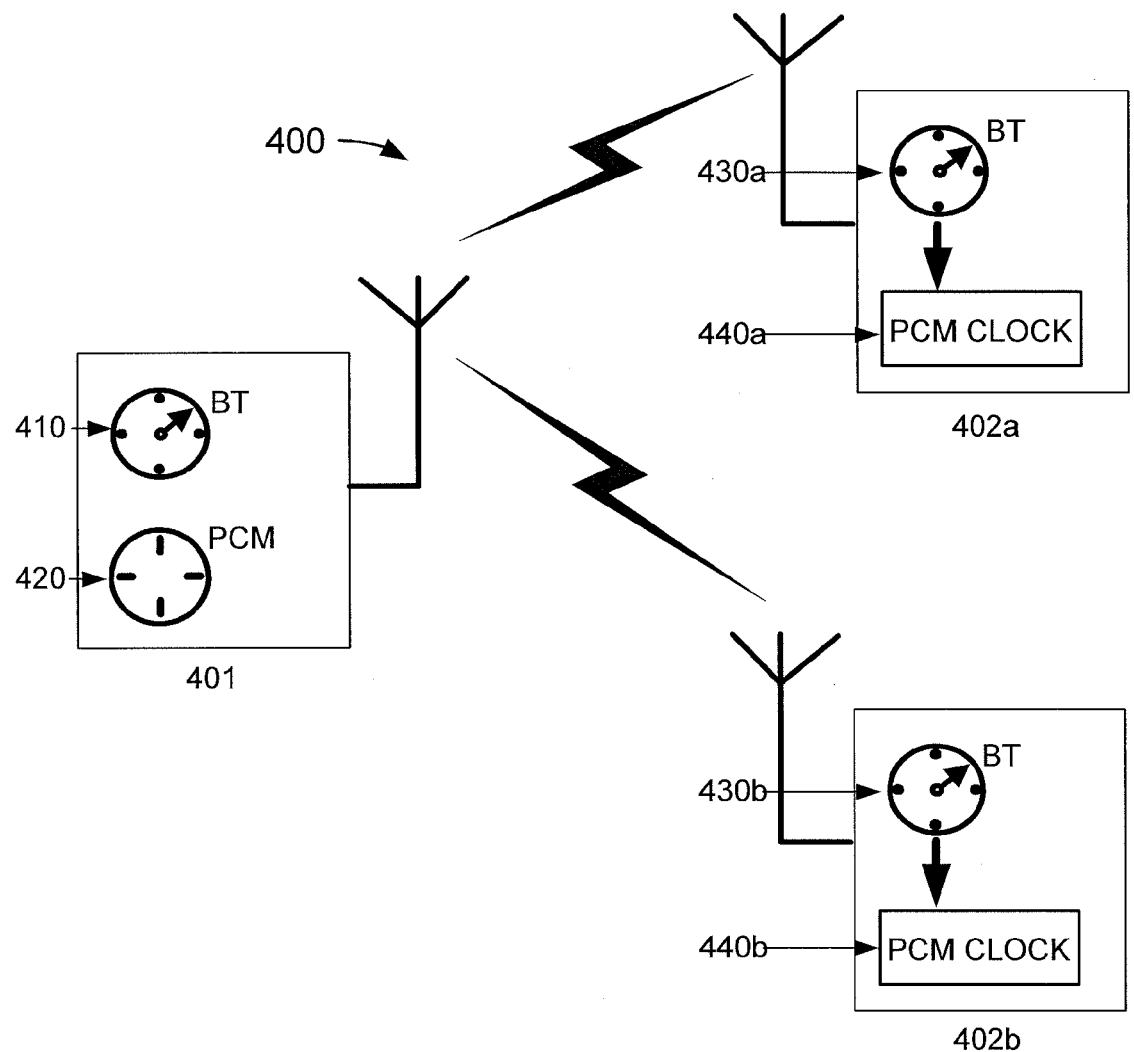
FIG. 4 is a diagram of an exemplary operation of clocks of a source device and clocks of sink devices that may be implemented by devices of the network of FIG. 1.

FIG. 4 is a diagram of an exemplary clock operation 400 of a source device 401 and sink devices 402a and 402b that may be implemented in network 100. In one implementation, master device 110 may act as source device 401 and slave devices 120a and 120b may act as sink devices 402a and 402b. In other implementations, another device of network 100 may act as the source device, and other devices of network 100 may act as sink devices. As an example, source device 401 may be a portable media playing device, such as an MP3 player or a mobile communication device, such as cellular telephone; sink device 402a may be a left wireless earpiece; and sink device 402b may be a right wireless earpiece. As another example, source device 401 may be an audio system, a television set, or a car stereo; sink device 402a may be a left wireless speaker; and sink device 402b may be a right wireless speaker.

Source device 401 may include source network clock 410 and source streaming clock 420. Sink device 402a may include sink network clock 430a and sink streaming clock 440a, and sink device 402b may include sink network clock 430b and sink streaming clock 440b. In one particular implementation, source network clock 410 and sink network clocks 430a and 430b may include Bluetooth clocks of a Bluetooth network, and source streaming clock 420 and sink streaming clocks 440a and 440b may include PCM clocks.

Sink network clocks 430a and 430b may be locked to (i.e. synchronized with) source network clock 410. Source device 401 may periodically provide network clock information to sink devices 402a and 402b. In one implementation, source device 401 may provide network clock synchronization information to sink devices 402a and 402b in each packet sent from source device 401. For example, source device 401 may provide network clock synchronization information in header 214 of each baseband packet 201 sent from source device 401.

Sink streaming clocks 440a and 440b may be generated from sink network clocks 430a and 430b. In one implementation, a multiplication factor N may be applied to sink network clocks 430a and 430b to generate sink streaming clocks 440a and 440b. Thus, a PCM streaming clock may be related to a piconet network clock by the following equation:

$$f_{PCM} = f_{piconet} * N,$$

where $f_{PCM}$ may represent the PCM streaming clock, $f_{piconet}$ may represent the piconet network clock, and N may represent the multiplication factor. For example, if the network clock has a fixed clock rate of 1.6 kHz, a PCM rate of 48 kHz may be obtained with a multiplication factor N=30, and a PCM rate of 44.1 kHz may be obtained with a multiplication factor N=28. In another implementation, sink streaming clocks 440a and 440b may be derived from sink network clocks 440a and 440b using another technique.

Since sink streaming clocks 440a and 440b may be derived from the same network clock, the sink streaming clocks may be synchronized, and delay variations between audio outputs of sink devices 402a and 402b may not occur. However, source streaming clock 420 may not be derived from the same source (e.g. the same crystal oscillator) as source network clock 410. Therefore, sink streaming clocks 440a and 440b may not be synchronized with source streaming clock 420, and buffer overflow or underflow in sink devices 402a and 402b may result. To synchronize sink streaming clocks 440a and 440b with source streaming clock 420, source device 401 may periodically provide a time stamp to sink devices 402a and 402b. The time stamp may relate source streaming clock 420 to source network clock 410. Sink devices 402a and 402b may receive the time stamp and adjust sink streaming clocks 440a and 440b based on the time stamp. For example, sink devices 402a and 402b may adjust multiplication factor N used to generate sink streaming clocks 440a and 440b.

Although FIG. 4 shows exemplary components of clock operation 400, in other implementations, clock operation 400 may contain fewer, different, additional, or differently arranged components than depicted in FIG. 4. In still other implementations, one or more components of clock operation 400 may perform one or more other tasks described as being performed by one or more other components of clock operation 400. Furthermore, while two sink devices are illustrated in FIG. 4, clock operation 400 may be employed with any number of sink devices. For example, in some implementations, sink streaming clocks 440a and 440b may not be generated from sink network clocks 430a and 430b. In such implementations, sink streaming clocks 440a and 440b may be free-running.

Figure 5:
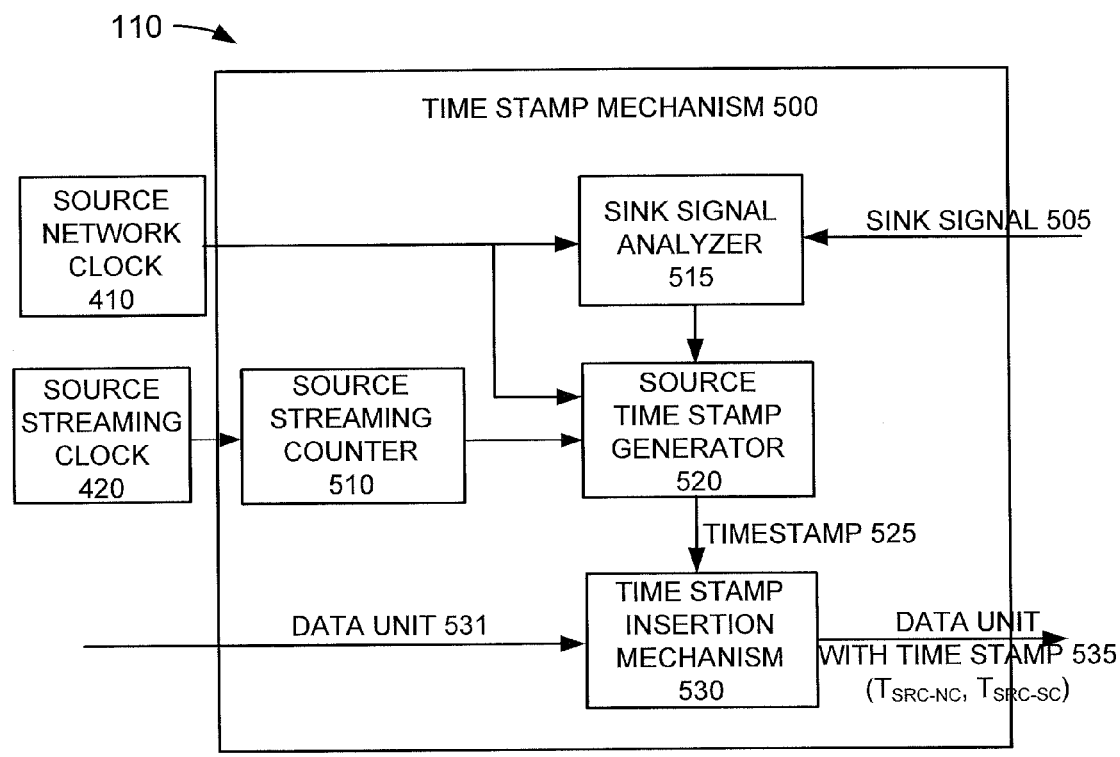
FIG. 5 is a diagram of exemplary components of a time stamp mechanism that may be implemented within a source device.

FIG. 5 is a diagram of exemplary components of a time stamp mechanism 500 of source device 401. Time stamp mechanism 500 may generate a time stamp and send the time stamp to one or more sink devices. In one implementation, time stamp mechanism 500 may be implemented in baseband controller 342 of source device 401 (e.g., by baseband processor 342a and baseband memory 342b). In another implementation, time stamp mechanism 500 may be implemented by processing unit 310 and memory 320 of source device 401. Time stamp mechanism 500 may include a source streaming counter 510, a sink signal analyzer 515, a source time stamp generator 520, and a time stamp insertion mechanism 530.

Source streaming counter 510 may store a value that may run at the sampling rate of source streaming clock 420. For example, at each sampling interval of source streaming clock 420, source streaming counter 510 may increment the value by one. Thus, if source streaming clock 420 is a PCM clock running at 44.1 kHz or 48 kHz, and if source streaming counter 510 is a 28 bit counter, the counter may wrap around in about an hour and a half.

In some situations, source streaming clock 420 may not be provided. For example, source device 401 may receive an audio or video stream from an external source (e.g. via a network connection). In such situations, source streaming clock 420 may need to be derived. Source streaming clock 420 may be derived, for example, by determining an average number of packets arriving within a fixed time interval (as determined by source network clock 410). This average number of packets may be used to drive source streaming counter 510. Furthermore, in other situations, packets may be arriving at irregular intervals, such that it may not be feasible to compute an average number of packets per given time interval. In such situations, it may not be feasible to derive source streaming clock 420, and source device 401 may not include source streaming clock 420 and/or source streaming counter 510.

Source streaming counter 510 may be initially reset along with sink streaming counters in sink devices communicating with source device 401. Baseband controller 342 may reset all streaming counters in network 100 using a control channel established via linking layer protocol 220 (e.g. via an L2CAP control channel). Source streaming counter 510 and all other streaming counters in network 100 may be reset at the rising edge of a particular value of network clock 410.

Sink signal analyzer 515 may receive signals from sink devices, and may activate generation of a time stamp by activating source time stamp generator 520 (with or without receiving a signal from a sink device). In one implementation, sink signal analyzer 515 may activate generation of a time stamp at a value associated with a particular point in the cycle of source network clock 410. In another implementation, time stamp activator 515 may activate generation of a time stamp at a particular value of source streaming clock 420.

Sink signal analyzer 515 may receive a sink signal 505 from a sink device. Sink signal 505 may be provided by a sink device in response to buffer overflow or underflow, and may indicate that a time stamp is not being generated at sufficiently frequent intervals. Sink signal 505 may cause sink signal analyzer 515 to change when a time stamp is generated. For example, time stamp signal 505 may cause sink signal analyzer 515 to activate source time stamp generator 520 more frequently. In some implementations, sink signal 505 may include information about how long it takes a signal to reach a sink device. For example, sink signal 505 may include a source network clock value, indicating a time when a time stamp was sent by source device 401, and a sink network clock value, indicating a time when a time stamp was received by a sink device. Sink signal analyzer 515 may use this information to determine how far into the future to extrapolate a time stamp, to ensure that the sink device receives a time stamp in time to match the source network clock value with an upcoming sink network clock value.

In some situations, source device 401 may not be able to generate a time stamp. For example, source device 401 may be receiving an audio stream from an external source, where packets arrive at irregular intervals. Sink signal analyzer 515 may receive sink signals from multiple sink devices. The sink signals may include time stamps from particular sink devices as well as the status of the buffer in each sink device. Sink signal analyzer 515 may determine a virtual time stamp based on the information received from the sink devices, and may provide the virtual time stamp to source time stamp generator 520. The sink devices may use the virtual time stamp to adjust their streaming clocks, thus remaining synchronized.

In one implementation, source time stamp generator 520 may generate time stamp 525 in response to being activated by sink signal analyzer 515. In another implementation, source time stamp generator 520 may generate time stamp 525 without being activated by sink signal analyzer 515. Source time stamp generator 520 may record a value of source network clock 410 and a value of source streaming counter 510 and include these values in time stamp 525. Source time stamp generator 520 may provide time stamp 525 to time stamp insertion mechanism 530. In one implementation, source time stamp generator 525 may extrapolate time stamp 525 based on a future value of source network clock 410. In another implementation, source time stamp generator 520 may include, in time stamp 525, an indication of when the next time stamp will be generated.

Time stamp insertion mechanism 530 may receive time stamp 525 from source time stamp generator 520 and may receive data unit 531 via baseband controller 342 of source device 401. Time stamp insertion mechanism 530 may insert time stamp 525 into data unit 531 and provide a data unit with time stamp 535 for sending to one or more sink devices.

Although FIG. 5 shows exemplary components of time stamp mechanism 500, in other implementations, time stamp mechanism 500 may contain fewer, different, additional, or differently arranged components than depicted in FIG. 5. In still other implementations, one or more components of time stamp mechanism 500 may perform one or more other tasks described as being performed by one or more other components of time stamp mechanism 500.

Figure 6:
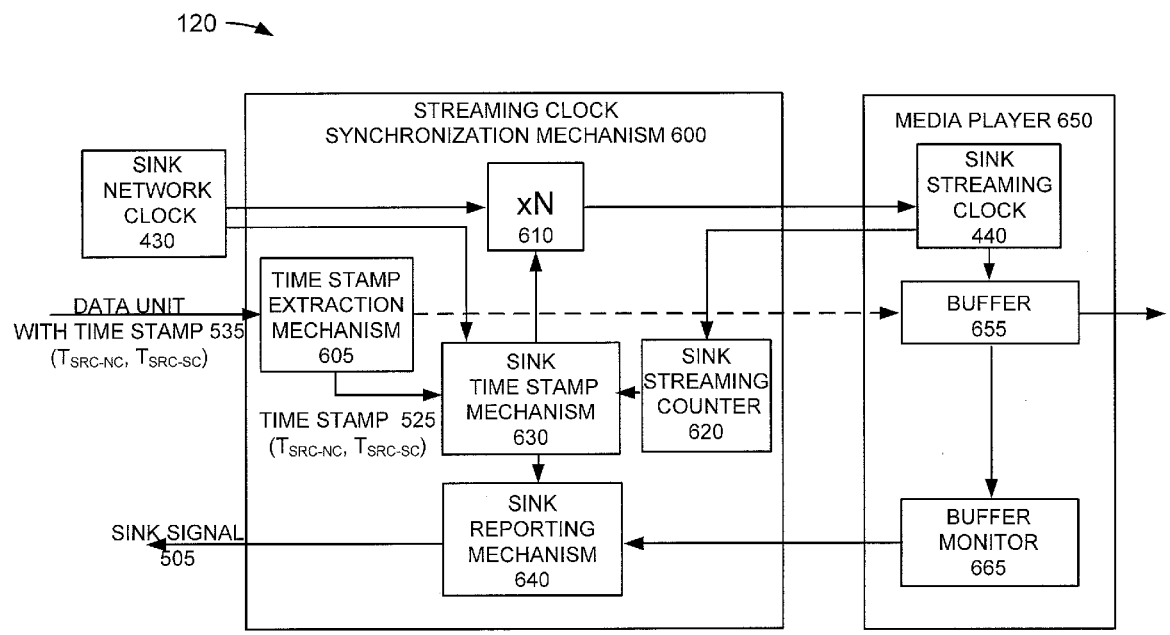
FIG. 6 is a diagram of exemplary components of a streaming clock synchronization mechanism and a media player that may be implemented in a sink device.

FIG. 6 is a diagram of exemplary components of a streaming clock synchronization mechanism 600 of a sink device, such as sink device 402*a* or sink device 402*b*. In one implementation, streaming clock synchronization mechanism 600 may be implemented in baseband controller 342 of a sink device (e.g., by baseband processor 342*a* and baseband memory 342*b*). In another implementation, streaming clock synchronization mechanism 600 may be implemented by processing unit 310 and memory 320 of a sink device. Streaming clock synchronization mechanism 600 may include a time stamp extraction mechanism 605, derivation mechanism 610, a sink streaming counter 620, a sink time stamp mechanism 630, and a sink reporting mechanism 640.

Time stamp extraction mechanism 605 may receive data unit with time stamp 535 and extract time stamp 525 from data unit 531. For example, time stamp extraction mechanism 605 may decapsulate the received data unit to retrieve time stamp 525. Time stamp extraction mechanism 605 may provide time stamp 525 to sink time stamp mechanism 630.

Derivation mechanism 610 may receive a signal from sink network clock 430 and derive sink streaming clock 440 from sink network clock 430. In an exemplary implementation, derivation mechanism 610 may derive sink streaming clock 440 by applying a particular multiplication factor to sink network clock 430. For example, derivation mechanism 610 may derive a network clock rate from the signal received from sink network clock 430, multiply the derived rate by the particular multiplication factor to arrive at a streaming clock rate, and provide the derived streaming clock rate to sink streaming clock 440. While derivation mechanism 610 is described herein as deriving sink streaming clock 440 by applying a multiplication factor to sink network clock 430, in other implementations, derivation mechanism 610 may derive the sink streaming clock 440 using another technique.

Sink streaming counter 620 may store a value that may run at the sampling rate of sink streaming clock 440. For example, at each sampling interval of sink streaming clock 440, sink streaming counter 620 may increment the value by one.

Sink time stamp mechanism 630 may receive time stamp 525 from time stamp extraction mechanism 605, a signal from sink network clock 430, and a signal from sink streaming counter 620.

In one implementation, a time stamp may be extrapolated into the future. For example, source device 401 may provide a time stamp that has been extrapolated into the future. Sink time stamp mechanism 630 may read the future value of source network clock 410 included in time stamp 525, and may wait until the value from the signal of sink network clock 430 matches the value of source network clock 410 read from time stamp 525. When the value of sink network clock 430 matches the future value of source network clock 410, sink time stamp mechanism 630 may read the value of sink streaming counter 620 and compare the value to the future value of source streaming counter 510 included in time stamp 525. Alternatively, source device 401 may not extrapolate the time stamp into the future. Rather, the extrapolation may be performed by sink time stamp mechanism 630. For example, sink time stamp mechanism 630 may receive time stamp 525 and extrapolate the source network clock value and the source streaming clock value into the future based on the ratio of the two values. Sink time stamp mechanism 630 may extrapolate the values based on an upcoming sink network clock value.

In another implementation, sink time stamp mechanism 630 may receive, from time stamp 525, an indication of when the next time stamp will be generated at the source. For example, time stamp 525 may include the source network clock value at which the next time stamp will be generated. In response, sink time stamp mechanism 630 may generate a sink time stamp at that source network clock value. In other words, time stamp mechanism 630 may record the value of sink streaming counter 620 at the sink network clock value indicated in the time stamp. When the next time stamp arrives, sink time stamp mechanism 630 may compare the sink streaming clock value recorded at the specified sink network clock value (which was indicated in the previous time stamp) with the source streaming clock value includes in the time stamp.

In yet another implementation, sink time stamp mechanism 630 may generate sink time stamps at periodic intervals. For example, sink time stamp mechanism 630 may store the value of sink streaming counter 620 at each increment of sink network clock 430. When a time stamp arrives from source device 401, sink time stamp mechanism 630 may retrieve the value of sink streaming counter 620 that was recorded at the sink network clock value that corresponds to the source network clock value included in the received time stamp.

Sink time stamp mechanism 630 may adjust derivation mechanism 610 based on the comparison of the value of the sink streaming counter with the value of the source streaming counter included in received time stamp 525. If the value of source streaming counter 510 matches the value of sink streaming counter 620 included in time stamp 525, derivation mechanism 610 may not need to be adjusted. If the value of source streaming counter 510 is higher than the value of sink streaming counter 620, the multiplication factor implemented by derivation mechanism 610 may need to be increased to speed up sink streaming clock 440. If the value of source streaming counter 510 is lower than the value of sink streaming counter 620, the multiplication factor implemented by derivation mechanism 610 may need to be decreased to slow down sink streaming clock 440.

In one implementation, derivation mechanism 610 may be adjusted by multiplying a current multiplication factor by a ratio of the value of source streaming counter 510 to the value of sink streaming counter 620. Thus, a new multiplication factor may be related to the old multiplication factor by the following equation:

$$N_{new} = N_{old} * (T_{SRC-SC}/T_{SNK-SC}),$$

where $N_{new}$ is the new multiplication factor, $N_{old}$ is the old multiplication factor, $T_{SRC-SC}$ is the value of the source streaming counter 510 from time stamp 525, and $T_{SNK-SC}$ is the value from sink streaming counter 620. In other implementations, derivation mechanism 610 may be adjusted using another technique.

Moreover, sink time stamp mechanism 630 may provide sink time stamps to sink reporting mechanism 640. Sink reporting mechanism 640 may send sink signal 505 to source device 401. In one implementation, sink reporting mechanism 640 may provide, in sink signal 505, the status of the buffer of the sink device. Alternatively or additionally, sink reporting mechanism 640 may provide, in sink signal 505, a sink time stamp received from sink time stamp mechanism 630.

Additionally, FIG. 6 illustrates exemplary components of a media player 650 of a sink device. Media player 650 may include sink streaming clock 440, a buffer 655, and a buffer monitor 665. Buffer 655 may temporarily store audio or video content that was received from the source and may output the audio or video content to an output device associated with the sink device, based on sink streaming clock 440. Buffer monitor 665 may monitor the status of the buffer and may provide the buffer information, such as the buffer size, to sink reporting mechanism 640. In one implementation, buffer monitor 665 may be implemented within media player 650. In other implementations, buffer monitor 665 may be implemented elsewhere, such as within streaming clock synchronization mechanism 600.

Although FIG. 6 shows exemplary components of streaming clock synchronization mechanism 600 and media player 650, in other implementations, streaming clock synchronization mechanism 600 or media player 650 may contain fewer, different, additional, or differently arranged components than depicted in FIG. 6. In still other implementations, one or more components of streaming clock synchronization mechanism 600 may perform one or more other tasks described as being performed by one or more other components of streaming clock synchronization mechanism 600.

While FIG. 5 has been described with respect to a source device and FIG. 6 has been described with respect to a sink device, any device of network 100 may act either a source device or a sink device (or both). Therefore, time stamp mechanism 500 of FIG. 5 and streaming clock synchronization mechanism 600 (and media player 650) of FIG. 6 may both be implemented in the same device (e.g., master device 110, slave devices 120a-120n, or parked devices 130a-130n).

Exemplary Data Units

Figure 7A:
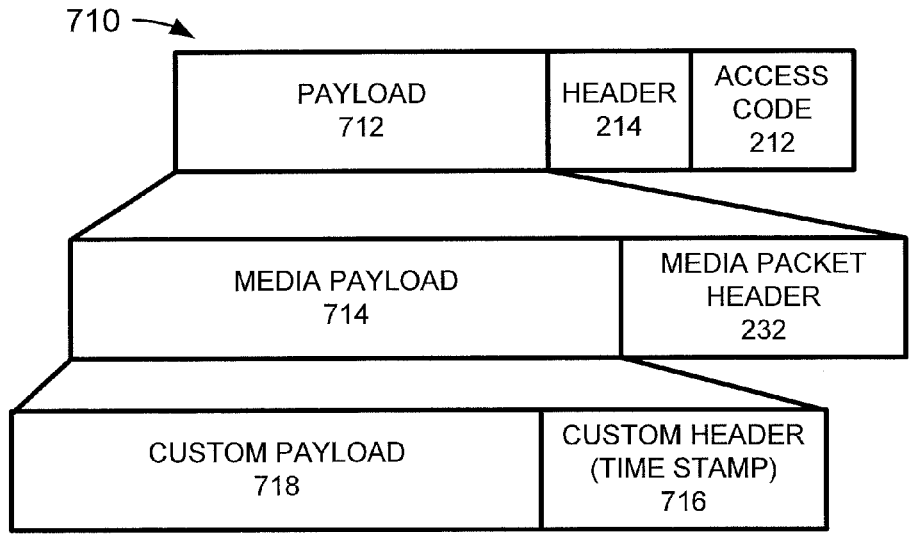
FIGS. 7A-7C illustrate exemplary data units for transmitting a time stamp from a source device to a sink device according to an implementation described herein.
Figure 7B:
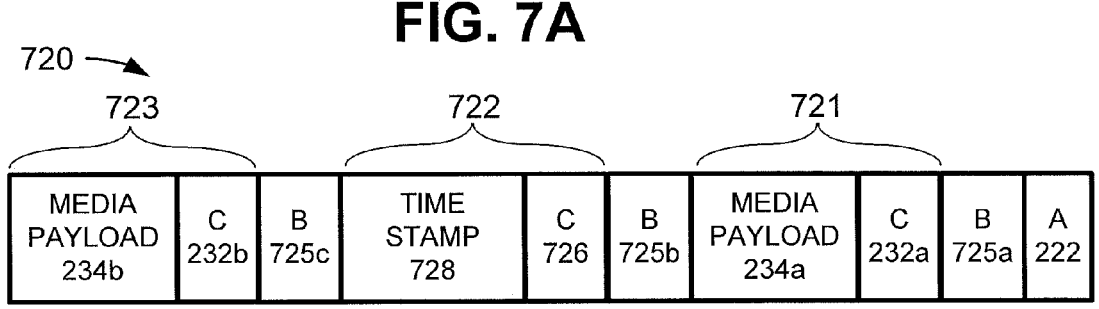
Figure 7C:
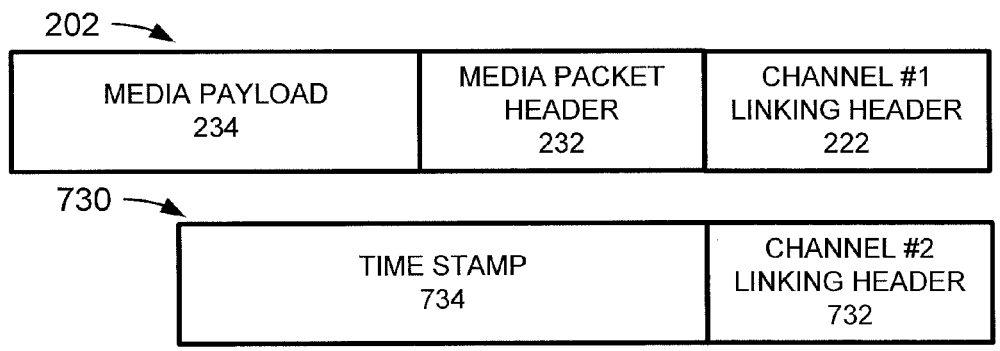

FIGS. 7A-7C illustrate exemplary data units for transmitting a time stamp from a source device to a sink device according to the implementations described herein. The term "data unit," as used herein, may refer to a packet, datagram, cell; a fragment of a packet, datagram or cell; or other types of data.

FIG. 7A illustrates a first exemplary packet 710 for transmitting a time stamp from a source device to a sink device. In the implementation of FIG. 7A, a custom header and a custom payload may be defined in a media packet of first exemplary packet 710. First exemplary packet 710 may include access code 212, header 214, and payload 712. Payload 712 may include media header 232 and media payload 714. Media payload 714 may include custom header 716 and custom payload 718. Custom header 716 may include time stamp 525.

As media packets may be generated at the stream management level and time stamps may be generated at the baseband level, baseband layer protocol 210 may send a signal to stream management layer protocol 230 to reserve space in media packet 202 for custom header 716. In response, stream management layer protocol 210 may add empty bits to media payload 714 corresponding in number to the size of custom header 716. When data unit 531 is received by time stamp insertion mechanism 530, time stamp insertion mechanism 530 may replace the empty bits with custom header 716, which may include time stamp 525.

In one implementation, custom header 716 may be included in every media packet. In other implementations, custom header 716 may only be included in particular media packets, such as media packets sent by source device 401 at particular intervals.

FIG. 7B illustrates a second exemplary packet 720 for transmitting a time stamp from a source device to a sink device. In the implementation of FIG. 7B, a time stamp may be multiplexed with media packets in the same linking layer channel. For example, if linking layer protocol 220 is implemented as L2CAP and stream management layer protocol 230 is implemented as AVDTP, the adaptation layer of AVDTP (AVDTP-AL) may provide multiplexing functionality, by including multiple media packets of differing types within a single L2CAP packet.

Second exemplary packet 720 may include linking header 222, adaptation layer headers 725a-725c, first packet 721, second packet 722, and third packet 723.

Adaptation headers 725a-725c may encapsulate packets 721, 722, and 723 within packet 720. Adaptation headers 725a-725c may include information identifying a type of packets 721, 722, and 723, such as whether a packet is a media packet or a control packet. First packet 721 and third packet 723 may be media packets and may include media headers 232a and 232b and media payloads 234a and 234b, respectively. In one implementation, second packet 722 may be a control packet, and may include control header 726 and control payload 728. Control header 726 may include information that identifies that control payload 728 includes a time stamp, and control payload 728 may include time stamp 525. In other implementations, second packet 722 may not include a header and may only include time stamp 525. In such implementations, adaptation header 725b may include information that identifies packet 722 as including a time stamp.

Time stamp insertion mechanism 530 may create packet 720, receive media packets from stream management layer protocol 230, and multiplex the received media packets with packet 720 into a single linking layer channel.

FIG. 7C illustrates first linking packet 202 and a third exemplary packet 730, which may be a second linking packet, for transmitting a time stamp from a source device to a sink device. In the implementation of FIG. 7C, a separate linking layer channel may be established for transmitting time stamps. In one implementation, the separate channel may be an existing channel used to transmit control information, such as control information associated with a media stream. In another implementation, the separate channel may be created specifically for transmission of time stamps.

First linking packet 202 may include a first linking header 222, which may include a first channel identifier, and a media packet which includes media header 232 and media payload 234. Second linking packet 730 may include a second linking leader 732, which may include a second channel identifier, and payload 734, which may include time stamp 525.

Time stamp insertion mechanism 530 may create packet 730, and send the packet on an existing control linking channel or create a new linking channel for transmitting packet 730.

Although FIGS. 7A-7C show exemplary components of packet 710, packet 720, and packet 730, in other implementations, packet 710, packet 720, or packet 730 may contain fewer, different, additional, or differently arranged components than depicted in FIGS. 7A-7C. In still other implementations, one or more components of packet 710, packet 720, or packet 730 may include information described as being included in one or more other components of packet 710, packet 720, or packet 730. Furthermore, in other implementations, data units different from packet 710, packet 720, or packet 730 may be employed to provide time stamp 525 from a source device to a sink device.

Exemplary Processes

Figure 8A:
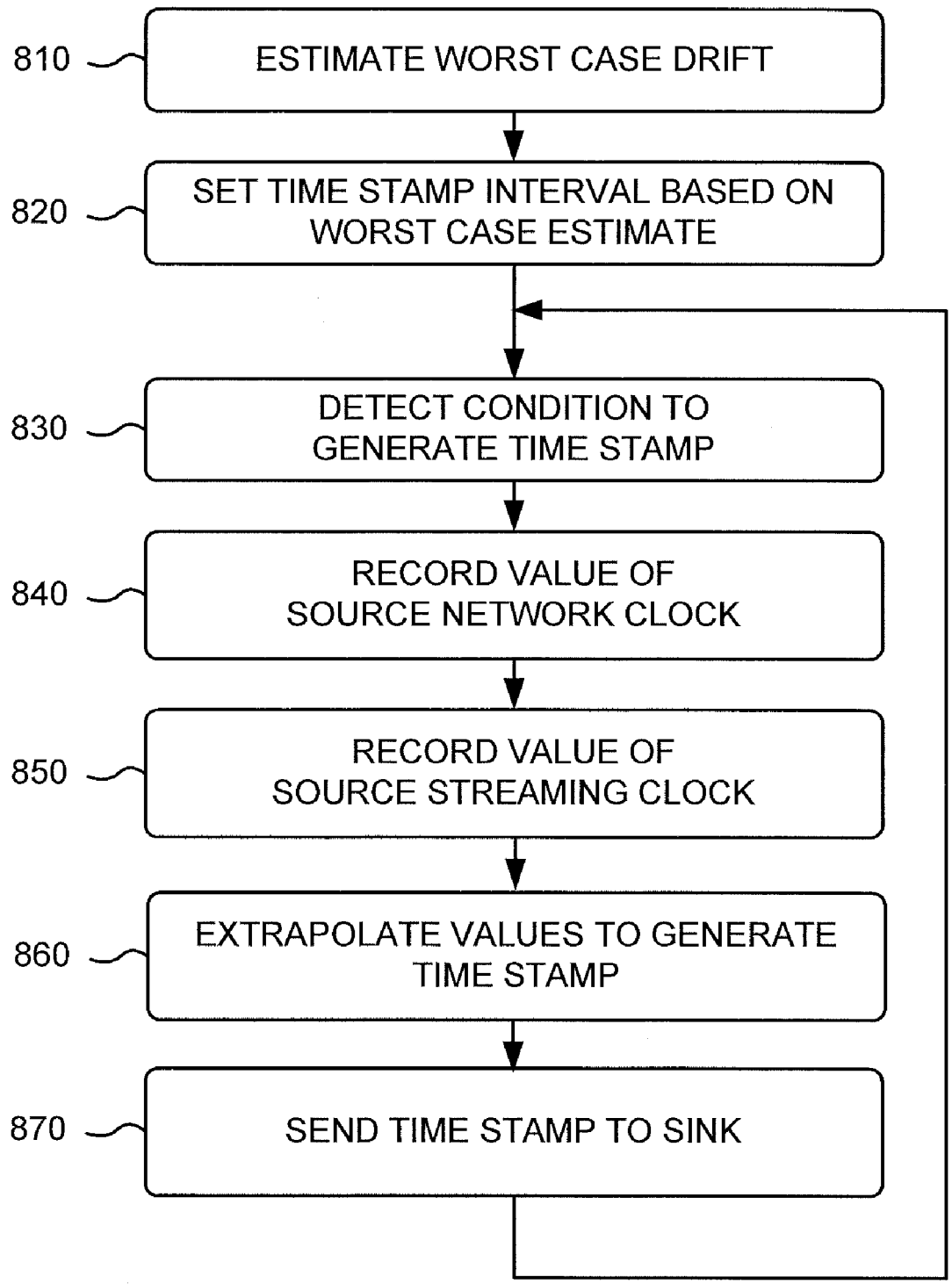
FIGS. 8A and 8B illustrate flow graphs of a first exemplary processes of generating and receiving a time stamp.
Figure 8B:
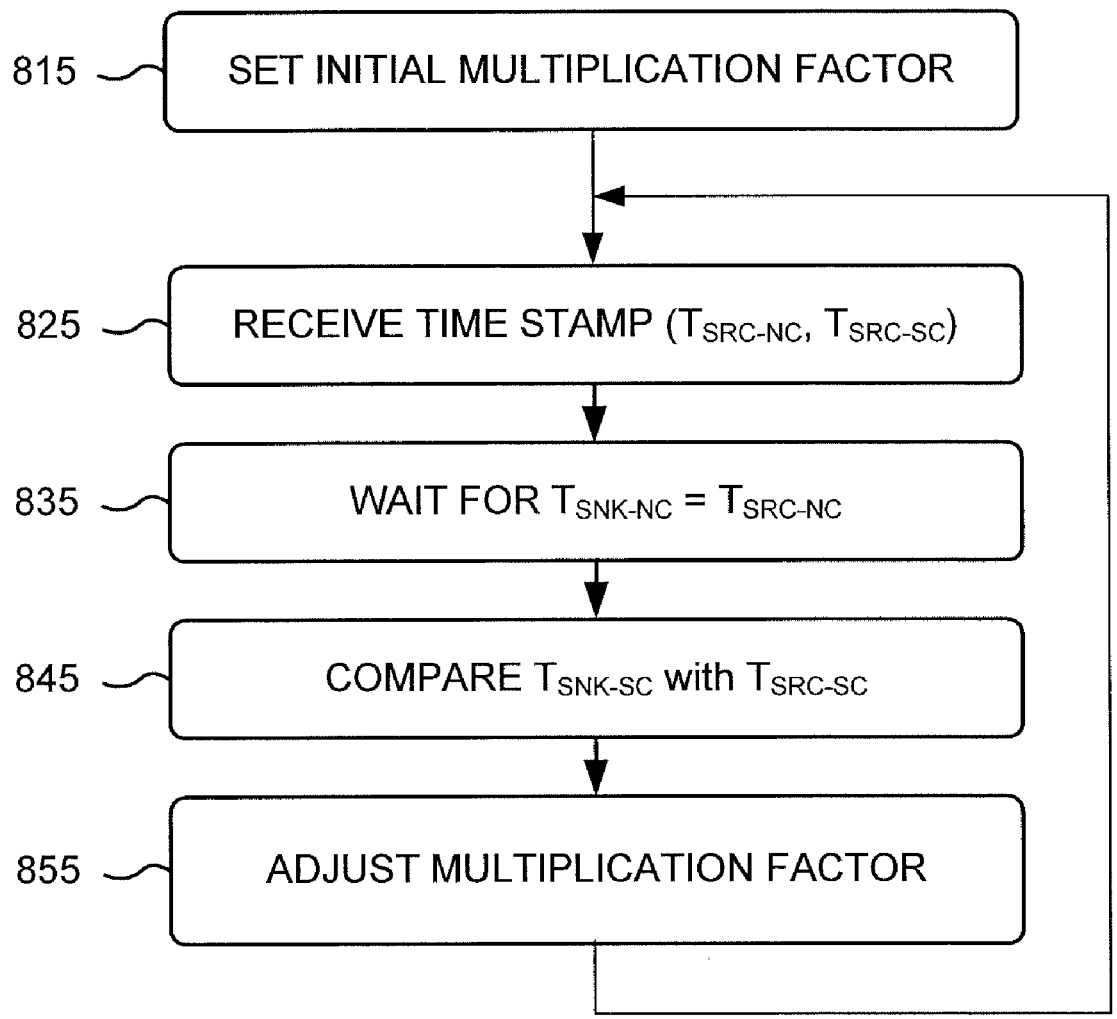

FIGS. 8A and 8B illustrate flow graphs of a first exemplary process of generating and receiving a time stamp. In one implementation, the process of FIG. 8A may be performed by source device 401, and the process of FIG. 8B may be performed by a sink device, such as sink device 402a or sink device 402b. In other implementations, some or all of the processes of FIG. 8A or 8B may be performed by another device or a group of devices.

FIG. 8A illustrates a flow graph for an exemplary process of generating a time stamp by extrapolating future source network clock and source streaming clock values based on determined present values of the source network clock and the source streaming clock. If source device 401 generates a time stamp based on the present source network clock value, by the time the time stamp reaches the sink device, the sink network clock may have already passed the source network clock value included in the time stamp. By extrapolating a future source network clock value and a future source streaming clock value from a present source network clock value and a present source streaming clock value, the sink device may receive the time stamp in time to be able to compare the source network clock value, included in the time stamp, with an upcoming sink network clock value.

The process of FIG. 8A may include estimating a worst case drift between a source streaming clock and a sink streaming clock (block 810). For example, sink signal analyzer 515 may determine the worst case drift between source streaming clock 420 and sink streaming clocks 440a and 440b. The worst case drift may be based on estimated maximum difference in the sampling rate based on source streaming clock 420 and the sampling rate of sink streaming clocks 440a and 440b.

A time stamp interval may be set based on the worst case estimate (block 820). For example, sink signal analyzer 515 may set the time stamp interval based on the estimated worst case drift. A greater estimated worst case drift may require a more frequent generation of a time stamp to realign source streaming clock 420 with sink streaming clocks 440a and 440b. In the process of FIG. 8, once a time stamp interval is established, the time stamp interval may not need to be adjusted.

A condition to generate a time stamp may be detected (block 830). For example, sink signal analyzer 515 may be set to activate source time stamp generator 520 at a particular value of source network clock 410, and in response to detecting the particular network clock value, may provide a signal to source time stamp generator 520 to generate a time stamp.

A value of a source network clock may be recorded (block 840). For example, source time stamp generator 520 may read a current value of source network clock 410. A value of a source streaming clock may be recorded (block 850). For example, source time stamp generator 520 may read a current value from source streaming counter 510.

The recorded values of the source network clock and the source streaming clock may be extrapolated to future values to generate a time stamp (block 860). For example, source time stamp generator 520 may determine a current rate of source streaming clock 420 compared to source network clock 410 based on the recorded values, and estimate future values based on the current rate, for a particular future value associated with source network clock 410. As an example, assume the recorded current source network clock value is 800 and the recorded current source streaming clock value is 24000, indicating a current multiplication factor N of 30. Based on this information, source time stamp generator 520 may extrapolate a time stamp at a future source streaming clock value of 1600 using the current multiplication factor of 30, generating a time stamp of (1600, 48000).

In one implementation, how far into the future to extrapolate may be based on a worst case estimate of how long it may take a time stamp to reach a sink device. For example, if a worst case estimate to reach a sink device is 10 μs, then source time stamp generator 520 may generate a time stamp based on a source network clock value at least 10 μs into the future. In another implementation, how far into the future to extrapolate may be based on information received from sink devices. For example, a sink device may provide information about how long it took for a time stamp to reach the sink device, by providing, to sink signal analyzer 515, a source network clock value at which a time stamp was generated, and a sink network clock value at which the time stamp was received at the sink device.

The generated time stamp may be sent to a sink device (block 860). For example, source time stamp generator 520 may provide time stamp 525 to time insertion mechanism 530. In the data unit implementation according to FIG. 7A, source time stamp generator 520 may send a message to stream management protocol 230 to reserve space in the next media packet, may receive the media packet, and may insert time stamp 525 into the reserved space of the media packet. In the data unit implementation according to FIG. 7B, source time stamp generator 520 may multiplex time stamp 525 into the next linking packet to be sent. In the data unit implementation according to FIG. 7C, source time stamp generator 520 may create a linking packet with a second channel identifier.

In one implementation of FIG. 8A, a time stamp interval may be set as short as possible, meaning that a time stamp may be generated as frequently as possible, such as with each media packet that is sent from source device 401. Given a data unit implementation according to FIG. 7A, a time stamp may be provided in each media packet. Given a data unit implementation according to FIG. 7B, a time stamp may be provided and multiplexed with each media packet. Given a data unit implementation according to FIG. 7C, a time stamp may be sent via second linking channel after every media packet sent via first linking channel. In other implementations of FIG. 8A, a time stamp may be sent less frequently. Sending a time stamp less frequently may conserve power and bandwidth.

FIG. 8B illustrates a flow graph of a first exemplary process of receiving a time stamp that may have been generated using according to a process corresponding to FIG. 8A. The process of FIG. 8B may include setting an initial multiplication factor (block 815). For example, derivation mechanism 610 may set the multiplication value N based on a predefined value, such as N=30. A time stamp may be received (block 825). For example, time stamp extraction mechanism 605 may receive packets from source device 401, may analyze the packets to determine whether a time stamp is included, and may extract time stamp 525 if present.

In the data unit implementation according to FIG. 7A, time stamp extraction mechanism 605 may receive a media packet and determine whether the media packet includes custom header 716. In the data unit implementation according to FIG. 7B, time stamp extraction mechanism 605 may receive linking packet 720 and analyze adaptation headers in the packet to determine whether the packet includes a time stamp. In the data unit implementation according to FIG. 7C, time stamp extraction mechanism 605 may receive packets with second channel linking header 732.

If a time stamp has been received, waiting may occur until sink network clock 430 reaches a value ($T_{SNK-NC}$) that matches the value ($T_{SRC-NC}$) of source network clock 410 recorded in the time stamp (block 835). For example, sink time stamp mechanism 630 may retrieve $T_{SNK-NC}$, monitor sink network clock 430, and wait until $T_{SNK-NC}=T_{SRC-NC}$. The current value ($T_{SNK-SC}$) of sink streaming counter 620 may be compared with the value ($T_{SRC-SC}$) of source streaming counter 510 stored in the time stamp (block 845). For example, when $T_{SNK-NC}=T_{SRC-NC}$, sink time stamp mechanism 630 may compare $T_{SNK-SC}$ to $T_{SRC-SC}$. A multiplication factor may be adjusted (block 855). For example, sink time stamp mechanism 630 may multiply the current multiplication factor by a ratio of the two values, namely by ($T_{SRC-SC}/T_{SNK-SC}$). Therefore, if $T_{SRC-SC}=T_{SNK-SC}$, the current multiplication factor may be multiplied by 1 and may not be changed.

While FIGS. 8A and 8B illustrate a process where source device 401 extrapolates time stamp 525 based on a future value of source network clock 410, in another implementation, the extrapolation may be performed by a sink device instead. The sink device may receive time stamp 525 that was not extrapolated and perform the extrapolation based on an upcoming sink network clock value. For example, assume source device 401 generates a time stamp of (800, 24000) and transmits this time stamp to a sink device. The sink device may receive the time stamp when the sink network clock is at 1000. Sink time stamp mechanism 630 may extrapolate the time stamp based on an upcoming sink network clock value of 1600, to a time stamp of (1600, 48000). When sink network clock 430 reaches the value of 1600, sink time stamp mechanism 630 may compare the value of 48000 from the extrapolated time stamp to the value stored in sink streaming counter 620.

Figure 9A:
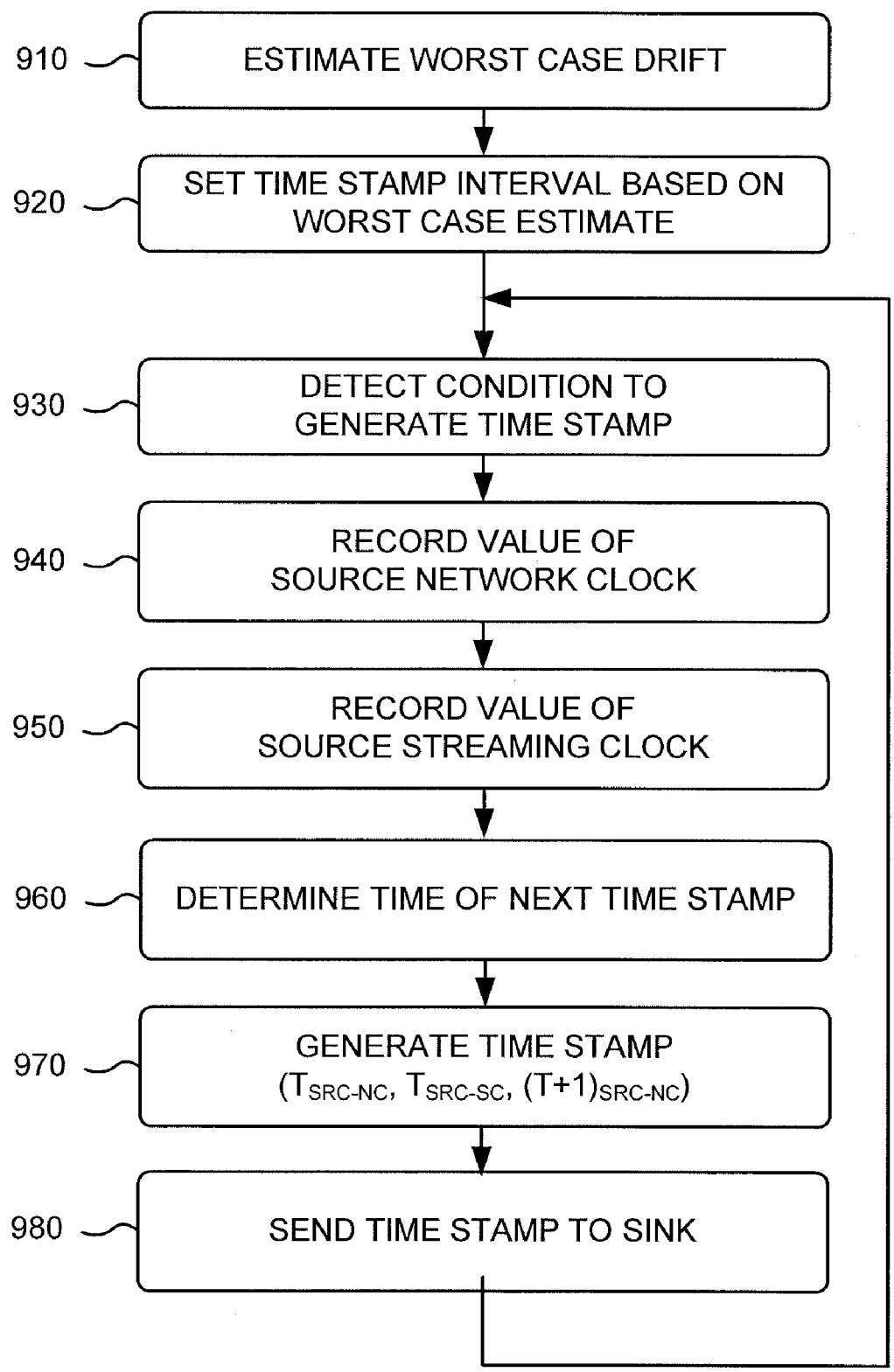
FIGS. 9A and 9B illustrate flow graphs of a second exemplary processes of generating and receiving a time stamp.
Figure 9B:
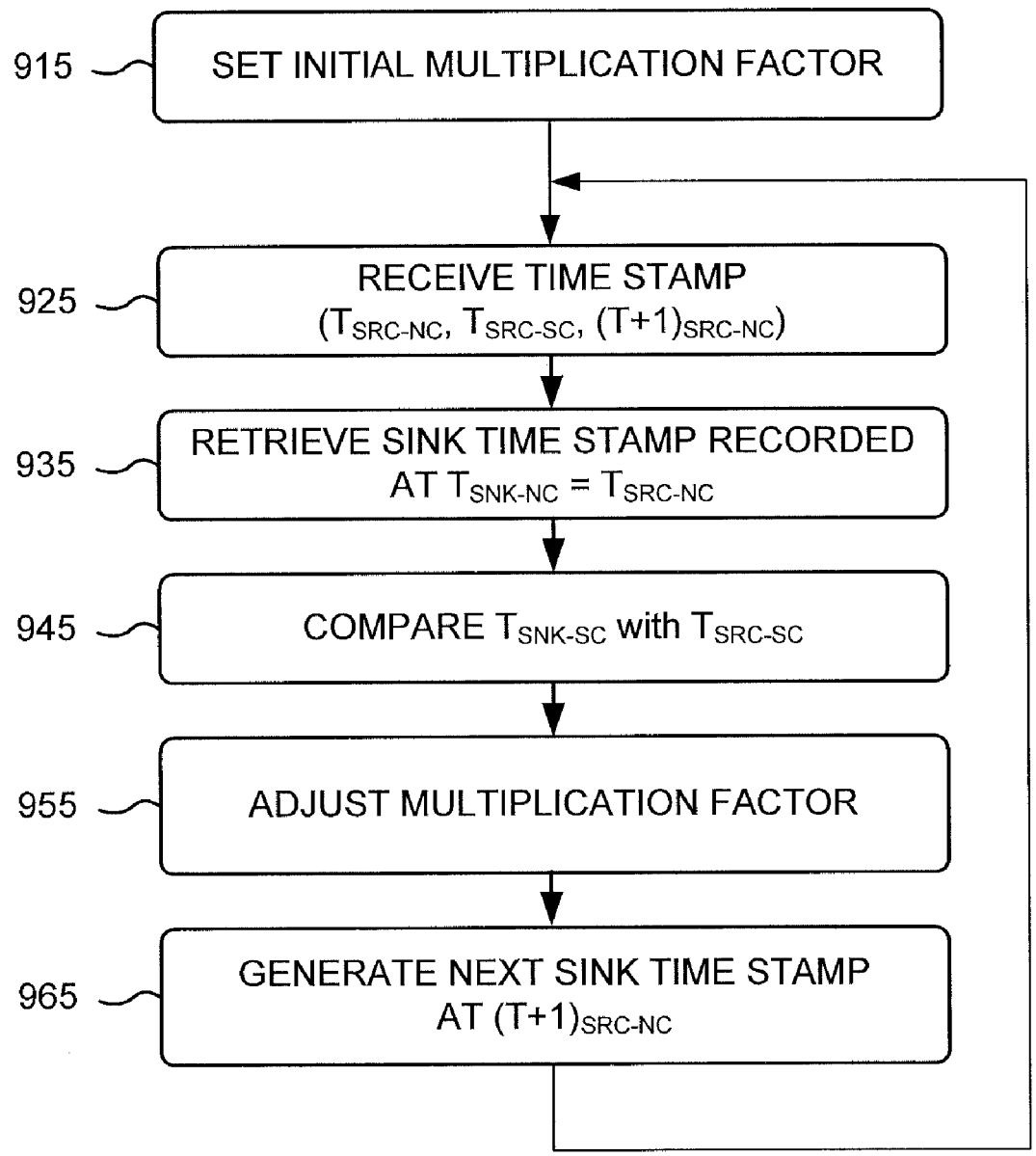

FIGS. 9A and 9B illustrate flow graphs of a second exemplary process of generating and receiving a time stamp. In one implementation, the process of FIG. 9A may be performed by source device 401, and the process of FIG. 9B may be performed by a sink device, such as sink device 402a or sink device 402b. In other implementations, some or all of the processes of FIG. 9A or 9B may be performed by another device or a group of devices.

FIG. 9A illustrates a flow graph for an exemplary process of generating a time stamp that may include information about when the next time stamp will be generated. Providing this information to a sink device may allow the sink device to record a sink time stamp at the time the time stamp is generated in source device 401. When the sink device receives the time stamp, the sink device may retrieve the recorded sink time stamp to compare the source streaming clock value in the received time stamp with the sink streaming clock value in the recorded sink time stamp.

The process of FIG. 9A may include estimating a worst case drift between a source streaming clock and a sink streaming clock (block 910); setting a time stamp interval based on the worst case estimate (block 920); detecting a condition to generate a time stamp (block 930); recording a value of a source network clock (block 940); and recording a value of a source streaming clock (block 950). Blocks 910-950 of FIG. 9A may correspond to blocks 810-850 of FIG. 8A, which have been described above.

The process of FIG. 9A may further include determining the time of the next time stamp (block 960). For example, source time stamp generator 520 may determine what the source network clock value will be based on the recorded current source network clock value and based on the time stamp interval. As an example, assume the recorded current source network clock value is 800 and the recorded current source streaming clock value is 24000, and the time stamp interval is set to 800. Based on this information, source time stamp generator 520 may determine that the next time stamp will be generated when the source network clock reaches a value of 1600. In one implementation, information indicating when the next time stamp will be generated in the source device may be included with the current time stamp that will be sent to the sink device. In other implementation, the information indicating when the next time stamp will be generated may be sent to sink devices separately from the current time stamp.

A time stamp may be generated (block 970). For example, time tamp generator may generate a time stamp that includes the recorded value of the source network clock ($T_{SNK-NC}$), the recorded value of the source streaming clock ($T_{SRC-SC}$), and the source network clock value associated with the next time stamp that will be generated (($T+1)_{SRC-NC}$).

The generated time stamp may be sent to a sink device (block 980). Block 980 of FIG. 9A may correspond to block 870 of FIG. 8A, which was described above.

FIG. 9B illustrates a flow graph of a second exemplary process of receiving a time stamp that may have been generated using according to a process corresponding to FIG. 9A. The process of FIG. 9B may include setting an initial multiplication factor (block 915). For example, derivation mechanism 610 may set the multiplication value N based on a predefined value, such as N=30. A time stamp may be received (block 925). For example, time stamp extraction mechanism 605 may receive packets from source device 401, may analyze the packets to determine whether a time stamp is included, and may extract time stamp 525 if present.

A sink time stamp may be retrieved (block 935). For example, sink time stamp mechanism 630 may extract the source network clock value from the received time stamp and retrieve a sink time stamp that may have been recorded at a sink network clock value corresponding to the source network clock value in the received time stamp. A sink time stamp may have been recorded at that time, because a previous time stamp may have included information that the next time stamp will be taken at this source network clock value. To initiate this process, a sink device may need to take an initial sink time stamp. An initial sink time stamp may be automatically recorded when a new audio or video stream is established.

As an example, assume the time stamp from the example given above, namely a time stamp of (800, 24000, 1600) was received. Sink time stamp mechanism 630 may receive a sink time stamp recorded when the sink network clock was at a value of 800, and compare the sink streaming counter value of that particular sink time stamp with the value of 24000.

The retrieved value of the source streaming counter 620 ($T_{SNK-SC}$) from the previously recorded sink time stamp may be compared with the value ($T_{SRC-SC}$) of source streaming counter 510 stored in the received time stamp (block 945). For example, sink time stamp mechanism 630 may compare $T_{SNK-SC}$ to $T_{SRC-SC}$. Derivation mechanism 610 may be adjusted (block 955). For example, sink time stamp mechanism 630 may multiply the current multiplication factor by a ratio of the two values, namely by ($T_{SRC-SC}/T_{SNK-SC}$). If $T_{SRC-SC}=T_{SNK-SC}$, the current multiplication factor may be multiplied by 1 and the multiplication may not be changed.

A next sink time stamp may be generated (block 965). For example, sink time stamp mechanism 630 may determine, from the received time stamp, when the next time stamp will be generated by source device 401. Sink time stamp mechanism 630 may generate the next sink time stamp when sink network clock 430 matches the source network clock value of the next time stamp to be generated (($T+1)_{SRC-NC}$). As an example, assume the time stamp from the example given above, namely a time stamp of (800, 24000, 1600) was received. Sink time stamp mechanism 630 may generate the next sink time stamp when sink network clock 430 reaches the value of 1600.

Figure 10A:
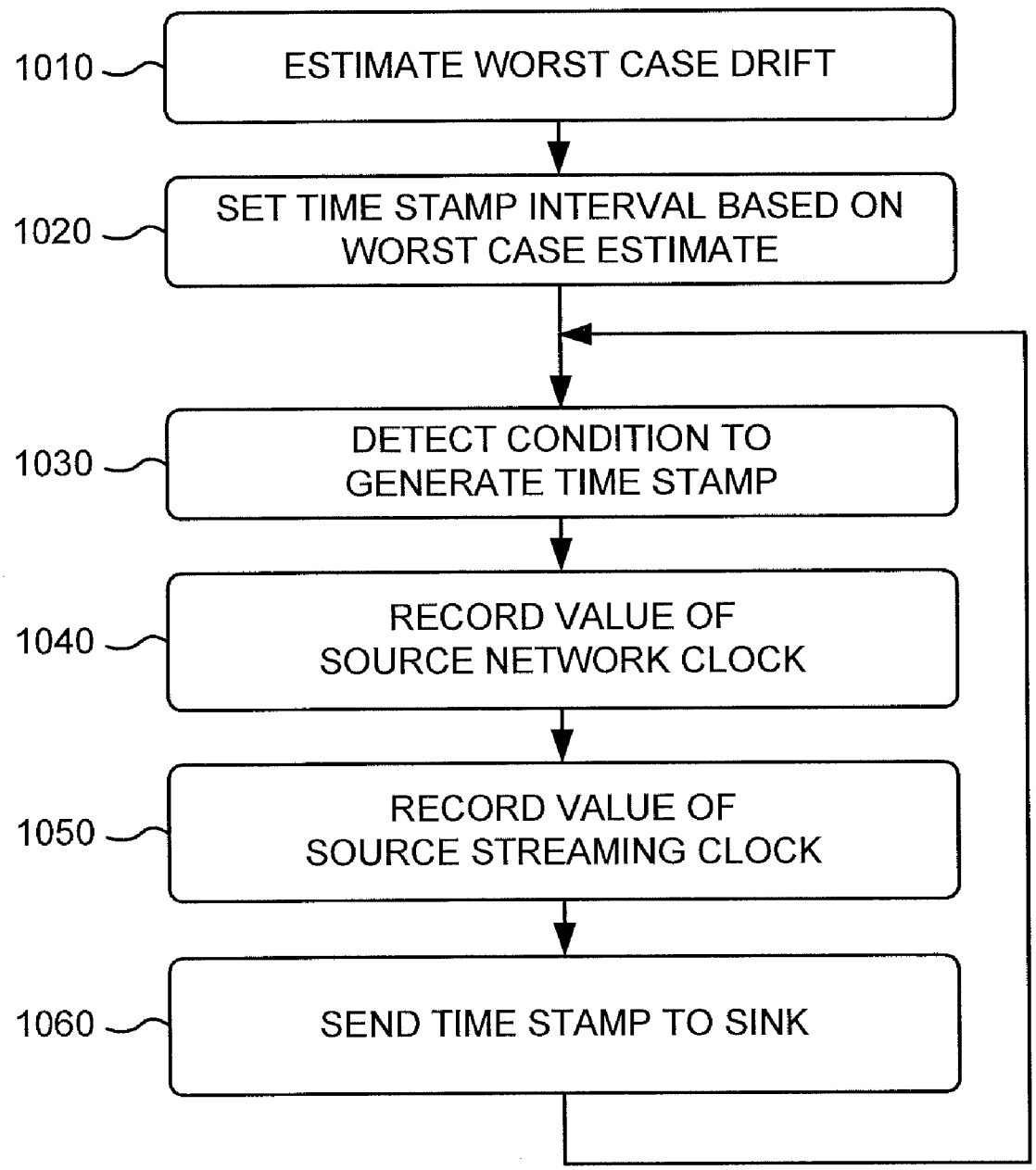
FIGS. 10A and 10B illustrate flow graphs of a third exemplary processes of generating and receiving a time stamp.
Figure 10B:
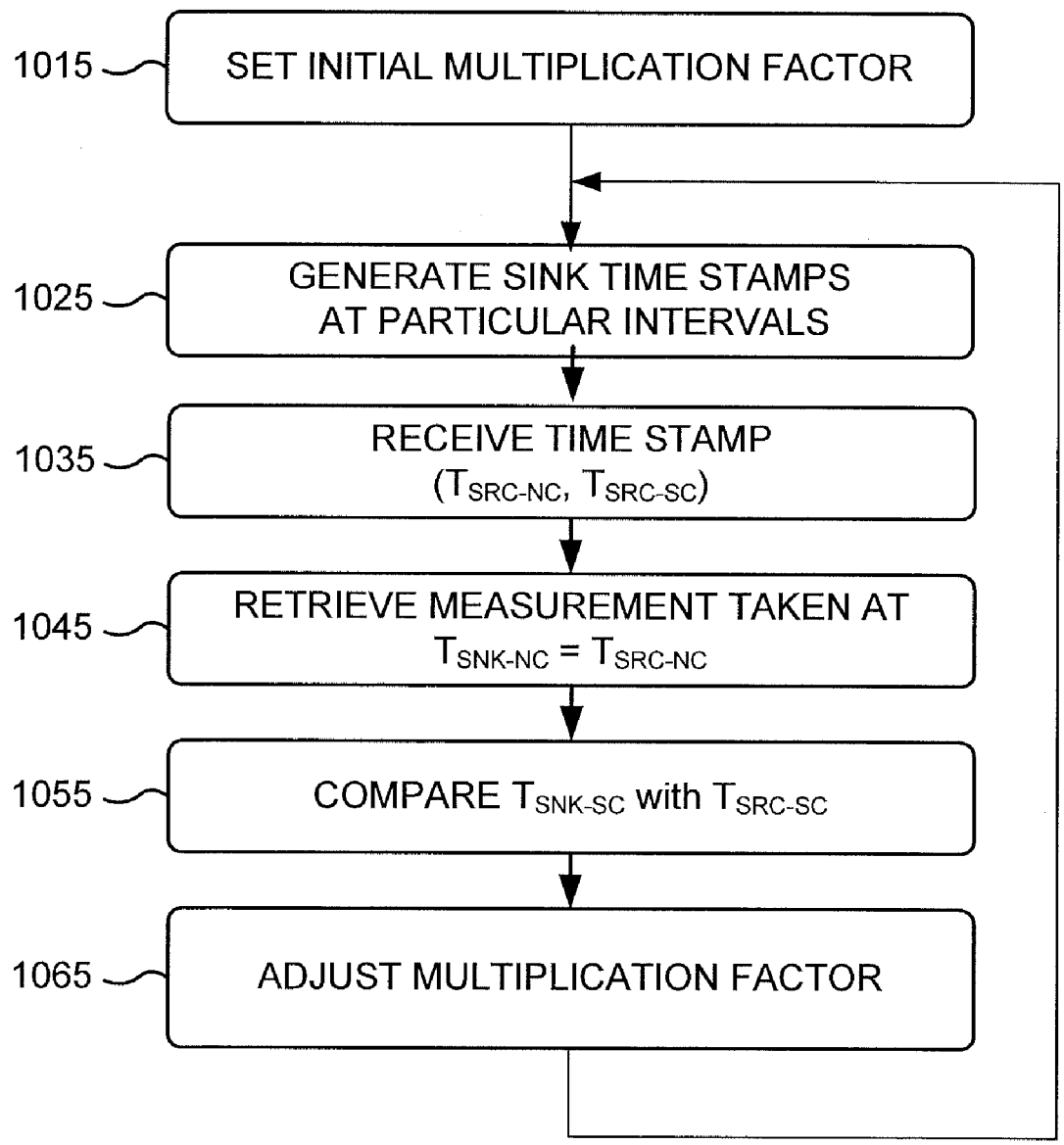

FIGS. 10A and 10B illustrate flow graphs of a third exemplary process of generating and receiving a time stamp. In one implementation, the process of FIG. 10A may be performed by source device 401, and the process of FIG. 10B may be performed by a sink device, such as sink device 402a or sink device 402b. In other implementations, some or all of the processes of FIG. 10A or 10B may be performed by another device or a group of devices.

FIG. 10A illustrates a flow graph for an exemplary process of generating a time stamp that may be implemented when the sink devices keep a running list of sink time stamps. In this implementation, source device 401 may not need to extrapolate future source network clock and source streaming clock values, and may not need to provide information to sink devices about when the next time stamp will be generated.

The process of FIG. 10A may include estimating a worst case drift between a source streaming clock and a sink streaming clock (block 1010); setting a time stamp interval based on the worst case estimate (block 1020); detecting a condition to generate a time stamp (block 1030); recording a value of a source network clock (block 1040); recording a value of a source streaming clock (block 1050); and sending a time stamp to sink devices (block 1060). Blocks 1010-1050 of FIG. 9A may correspond to blocks 810-850 of FIG. 8A, and block 1060 may correspond to block 870. As blocks 810-850 and 870 have been described above with respect to FIG. 8A, the description is not repeated here.

FIG. 10B illustrates a flow graph of a third exemplary process of receiving a time stamp that may have been generated using according to a process corresponding to FIG. 10A. The process of FIG. 10B may include setting an initial multiplication factor (block 1015). For example, derivation mechanism 610 may set the multiplication value N based on a predefined value, such as N=30.

Sink time stamps may be generated at particular intervals (block 1025). For example, sink time stamp mechanism 630 may generate a sink time stamp at particular intervals associated with sink network clock 430. In one implementation, sink time stamp mechanism 630 may generate a sink time stamp at each increment of sink network clock 430. In another implementation, sink time stamp mechanism 630 may generate sink time stamps at less frequent intervals. When sink time stamps are generated less frequently, interpolation between two sink time stamps may be performed when a received source time stamp does not match one of the recorded sink time stamps. For example, assume that sink time stamps were generated at sink network clock values of 0, 500, 1000, 1500, and assume a source time stamp of (800, 24000) was received by sink time stamp mechanism 630. Sink time stamp mechanism 630 may interpolate a sink time stamp for a sink network clock value of 800 based on recorded sink time stamps. For example, sink time stamp mechanism 630 may perform linear regression analysis on the recorded sink time stamps. By using more measurement points, more complex regression may be applied to get higher accuracy. Thus, sink time stamps may not need to correspond exactly to time stamps received from source device 401.

A time stamp may be received (block 1025). For example, time stamp extraction mechanism 605 may receive packets from source device 401, may analyze the packets to determine whether a time stamp is included, and may extract time stamp 525 if present.

A sink time stamp may be retrieved (block 1035). For example, sink time stamp mechanism 630 may extract the source network clock value from the received time stamp and retrieve a sink time stamp that may have been recorded at a sink network clock value corresponding to the source network clock value in the received time stamp. As the sink device has been generating time stamps at particular intervals, such as at each increment of sink network clock 430, sink time stamp mechanism 630 may retrieve a sink time stamp whose sink network clock value matches the source network clock value in the time stamp received from source device 401.

The retrieved value of the source streaming counter 620 ($T_{SNK-SC}$) from the retrieved sink time stamp may be compared with the value ($T_{SRC-SC}$) of source streaming counter 510 stored in the received time stamp (block 1045). For example, sink time stamp mechanism 630 may compare $T_{SNK-SC}$ to $T_{SRC-SC}$. Derivation mechanism 610 may be adjusted (block 1055). For example, sink time stamp mechanism 630 may multiply the current multiplication factor by a ratio of the two values, namely by ($T_{SRC-SC}/T_{SNK-SC}$). If $T_{SRC-SC}=T_{SNK-SC}$, the current multiplication factor may be multiplied by 1 and the multiplication may not be changed.

Figure 11A:
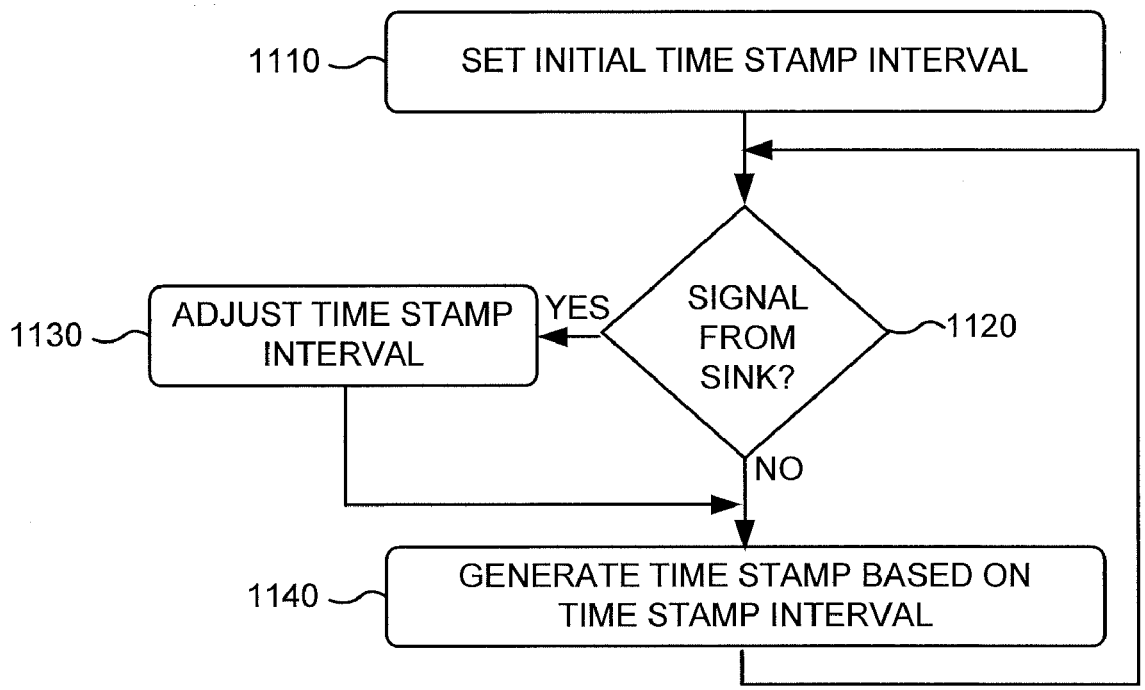
FIGS. 11A and 11B illustrate flow graphs of an exemplary process of adjusting a time stamp interval.
Figure 11B:
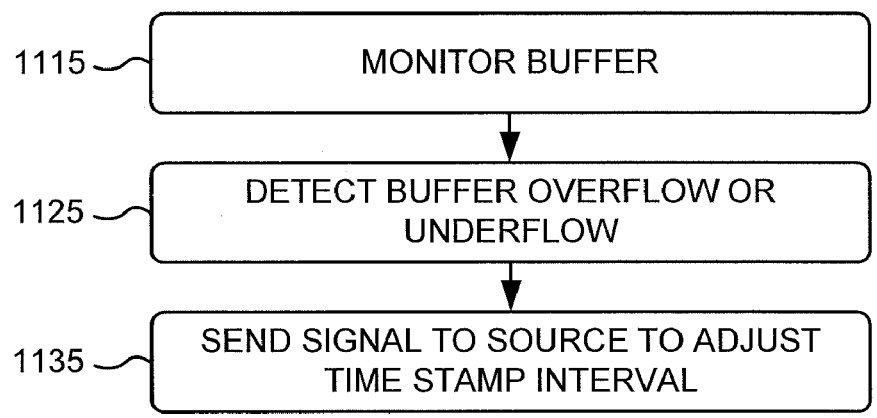

FIGS. 11A and 11B illustrate flow graphs of an exemplary process of adjusting a time stamp interval. In one implementation, the process of FIG. 11A may be performed by source device 401, and the process of FIG. 11B may be performed by a sink device, such as sink device 402a or sink device 402b. In other implementations, some or all of the processes of FIG. 11A or 11B may be performed by another device or a group of devices.

The process of FIG. 11A may include setting an initial time stamp interval (block 1110). Initial time stamp interval may be set based on an estimate of an interval that may be less than a worst case estimate of drift between source streaming clock 420 and sink streaming clock 440, based on optimizing power and bandwidth usage while preventing buffer overflow or underflow. For example, sink signal analyzer 515 may set an initial time stamp interval based on a particular value. A determination may be made whether a signal was received from a source device (block 1120). No signal from a sink device may be detected (block 1120—no). For example, sink signal analyzer 515 may not receive a sink signal 505 from a sink device. In response, sink signal analyzer 515 may not need to adjust the time stamp interval.

A signal from a sink device may be detected (block 1120—yes). In response, the time stamp interval may be adjusted (block 1130). For example, sink signal analyzer 515 may receive a sink signal 505 from a sink device. In response, sink signal analyzer 515 may adjust the time stamp interval based on information received via sink signal 505. In one implementation, sink signal 505 may simply be an indication to decrease the time stamp interval and send the time stamp more frequently. In another implementation, sink signal 505 may include information about the degree of buffer overflow and underflow, and sink signal analyzer 515 may adjust the time stamp interval based on the degree of buffer overflow or underflow.

A time stamp may be generated based on the adjusted time stamp interval (block 1140). For example, sink signal analyzer 515 may indicate to source time stamp generator 520 to generate time stamps at increments of source network clock 410 (or source streaming clock 420) corresponding to the new time stamp interval. The process of generating time stamps may continue based a process described with respect to FIG. 8A (continuing at block 830), based on a process described with respect to FIG. 9A (continuing at block 930), based on a process described with respect to FIG. 10a (continuing at block 1030), or any other process of generating a time stamp.

FIG. 11B illustrates a flow graph of an exemplary process of sending a signal from a sink device to a source device to adjust a time stamp interval. The process of FIG. 11B may include monitoring a playout buffer (block 1115). For example, buffer monitor 665 may monitor the size of buffer 655. Buffer overflow or underflow may be detected (block 1125). For example, buffer monitor 665 may determine that the size of buffer 655 is outside a particular value, meaning that the size of the buffer is less than a first particular value or more than a second particular value. A signal may be sent to the source device to adjust the time stamp interval (block 1135). For example, buffer monitor 665 may provide information about the status of buffer 655 to sink reporting mechanism 640, and sink reporting mechanism 640 may generate a packet that includes sink signal 505, and provide the packet to the baseband controller of the sink device for transmission to the source device. In one implementation, sink signal 505 may be provided in a media control packet by stream management layer protocol 230 of the sink device. In another implementation, sink signal 505 may be provided via an established control channel by linking layer protocol 220.

Figure 12A:
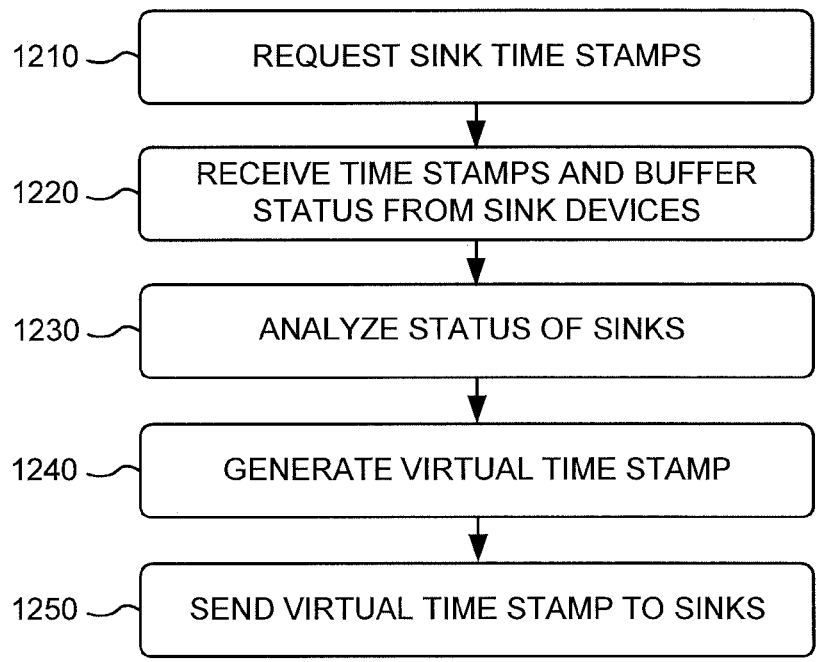
FIGS. 12A and 12B illustrate flow graphs of an exemplary process of generating a time stamp based on information received from a sink device.
Figure 12B:
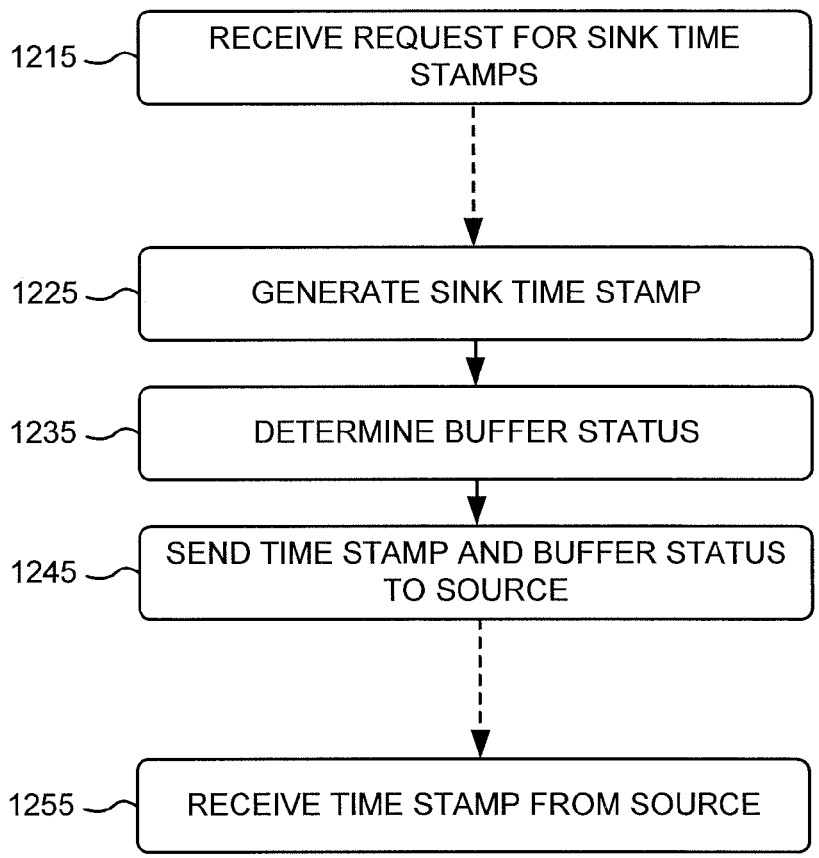

FIGS. 12A and 12B illustrate flow graphs of an exemplary process of generating a time stamp based on information received from a sink device. In one implementation, the process of FIG. 12A may be performed by source device 401, and the process of FIG. 12B may be performed by a sink device, such as sink device 402a or sink device 402b. In other implementations, some or all of the processes of FIG. 12A or 12B may be performed by another device or a group of devices.

FIGS. 12A and 12B illustrate a process that may be implemented when source device 401 may not be able to generate a time stamp, such as when source device 401 may be receiving an audio stream from an external source, with packets that arrive at irregular intervals. In such situations, there may be no effective source streaming clock. Instead, source device 401 may receive time stamps and buffer status from sink devices and generate virtual time stamps based on the received information. The virtual time stamps may allow the sink devices to adjust their respective streaming clocks, while remaining synchronized.

The process of FIG. 12A, which may be performed by source device 401, may include requesting time stamps from sink devices (block 1210). For example, source time stamp generator 520 may determine that no effective source streaming clock can be estimated, and may request time stamps from the sink devices. The request may be sent, for example, via a linking layer control channel packet, and may sent when an audio stream is established.

In response, sink time stamps and/or buffer information from sink devices may be received (block 1220). For example, sink signal analyzer 515 may receive sink signal 505 from sink device 402a and another sink signal 505 from sink device 402b.

The status of sink devices may be analyzed (block 1230). For example, sink signal analyzer 515 may determine whether any sink devices are experiencing buffer overflow or underflow. Alternatively or additionally, sink signal analyzer 505 may determine whether streaming clocks in sink devices that are currently receiving audio or video streams from source device 401 are running at the same rate. Sink signal analyzer 515 may determine whether to increase or decrease the rate of the streaming clocks of the sink devices, based on the received information. For example, if sink signal analyzer 515 determines that buffer overflow is imminent in sink device 402a, sink signal analyzer 515 may increase the rate of the streaming clocks of both sink device 402a and sink device 402b. This may be accomplished by determining a multiplication factor associated with sink device 402a from the sink time stamp received from sink device 402a and increasing the multiplication factor. If buffer underflow is imminent, the multiplication factor may be decreased.

A virtual time stamp may be generated (block 1240). For example, sink signal analyzer 515 may provide a new multiplication factor to time stamp generator 520, and time stamp generator my generate a virtual time stamp based on the new multiplication factor.

A virtual time stamp may be sent to sink devices (block 1250). For example, time stamp insertion mechanism 530 may insert the generated virtual time stamp into a packet and provide the packet for transmission to the sink devices. Prior to being sent, the virtual time stamp may undergo further processing, in accordance with any of the processes of FIG. 8A, FIG. 9A, or FIG. 10A. For example, if the process of FIG. 8A is implemented, the virtual time stamp by be extrapolated into a future network clock value.

As an example, assume a sink time stamp of (800, 24000, overflow) is received from sink device 402a, indicating a sink network clock value of 800, a sink streaming clock value of 24000, and an indication of buffer overflow. This may mean that the rate of sink streaming clock 440a in sink device 402a needs to be increased. As the current multiplication factor is 30, the multiplication factor may be increased to 32 and a virtual time stamp may be generated. For example, assume that when the new multiplication factor is provided to time stamp generator 520, the source network clock 410 is at a value of 900. In response, time stamp generator 520 may generate a virtual time stamp of (900, 28800).

The process of FIG. 12B, which may be performed by a sink device, may include receiving a request for sink time stamps from a source device (block 1215). For example, sink time stamp mechanism 630 may receive a request, via a linking layer control channel, to generate sink time stamps and send the sink time stamps back to source device 401.

In response to the request, a sink time stamp may be generated (block 1225). For example, sink time stamp mechanism 630 may generate a sink time stamp in response to detecting that no time stamps are being received from source device 401. Alternatively, sink time stamp mechanism 630 may retrieve the most current sink time stamp that has been generated and stored. Sink time stamp mechanism 630 may provide the sink time stamp to sink reporting mechanism 640.

Buffer status may be determined (block 1235). For example, buffer monitor 665 may determine the size of the buffer, and/or whether buffer overflow or underflow is occurring or is imminent. In one implementation, buffer monitor 665 may provide this information periodically to sink reporting mechanism 640. In another implementation, sink reporting mechanism 640 may query buffer monitor 665 in response to receiving a sink time stamp from sink time stamp mechanism 630.

A sink time stamp and buffer status may be sent to a source device (block 1245). For example, sink reporting mechanism 640 may provide the sink time stamp and the status of the buffer to source device 401 via sink signal 505. In response, a time stamp from the source device may be received (block 1255). The received time stamp may be processed in accordance with any of the processes of FIG. 8b, FIG. 9B, FIG. 10B, or by any other process of processing a time stamp received from a source device.

EXAMPLE

The following example is provided to further illustrate an aspect of a particular implementation described herein. Assume that a portable media player is receiving an audio stream across an Ethernet connection. Thus, the streaming rate of the audio stream may be determined by a source outside of the portable media player. Further assume that the portable media player transmits the audio stream to a wireless left earpiece and a wireless right earpiece across a Bluetooth piconet that is running at 1.6 kHz. Thus, the Bluetooth clock of the portable media player and the Bluetooth clock of the left and right earpieces may all be running at 1.6 kHz. Further assume that the streaming rate of the audio stream at a particular time is based on a PCM clock that is running at 48 kHz, and assume that a multiplication factor has been set to 30. Assume that a time stamp is generated when Bluetooth clock, of the portable media player, reaches the value 800. At this particular Bluetooth clock value, a PCM counter in the portable media player may read 24000. Thus, a time stamp with value (800, 24000) may be generated. Further assume that time stamps are extrapolated to a future network clock value. Thus, assume that the time stamp is extrapolated by 100 ticks of the network clock, to a network clock value of 900. Therefore, a time stamp with value (900, 27000) may be sent to the left and right earpieces.

When left and right earpieces receive the time stamp with value (900, 27000), sink time stamp mechanisms 630 in the baseband controllers of the left and right earpieces may wait until the Bluetooth clocks in the earpieces reaches 900. At this point, the value from streaming counters 620 of the earpieces may be read. As the multiplication factor implemented by derivation mechanism 610 has been set to 30, the PCM clocks of the left and right earpieces may have been running at 48 kHz, and streaming counters 630 of the earpieces may read 27000. Thus, sink time stamp mechanisms 630 of the earpieces may multiply the current multiplication factor by 1 and derivation mechanism 610 may not be adjusted.

Further assume that at some later time, the streaming rate associated with the audio stream rate changes to 22.4 kHz. The next time stamp may be generated when the Bluetooth clock of portable media player reaches 1600, at which time source streaming counter 510 may read 22400. Thus, a time stamp with value (1600, 44800) may be sent generated. This time stamp may be extrapolated to network clock value of 1700. Therefore, a time stamp with value (1700, 47600) may be sent to the left and right earpieces.

When the left and right earpieces receive a time stamp with value (1700, 47600), sink time stamp mechanisms 630 of the left and right earpieces may wait until Bluetooth clocks of the left and right earpieces reach 1700. At this point, the value from sink streaming counters 620 may be read. As the multiplication factor implemented by derivation mechanism 610 has been set to 30, the PCM clocks of the left and right earpieces may have been running at 48 kHz, and sink streaming counters 620 may read 51000 (based on N=30).

Sink time stamp mechanisms 630 of the left and right earpieces may determine that the value of source streaming counter 510 from the time stamp does not match the value of sink streaming counters 620, and derivation mechanism 610 may need to be adjusted. In other words, the current multiplication factor may be multiplied by a ratio of the values of the two streaming counters, namely by (47600/51000), or by 0.9333. Thus, the multiplication factor implemented by derivation mechanism 610 may be changed from 30 to 28. Therefore, the PCM clocks of the left and right earpieces may subsequently run at a rate of 22.4 kHz, thereby synchronizing the sink PCM clocks with the source PCM clock.

CONCLUSION

The foregoing description provides illustration and description, but is not intended to be exhaustive or to limit the invention to the precise form disclosed. Modifications and variations are possible in light of the above teachings or may be acquired from practice of the invention.

For example, in one implementation, sink streaming clock 440 may not be derived from sink network clock 430. Rather, a sink device may include a free-running sink streaming clock that may not be derived from the sink network clock. The free-running sink streaming clock may be continuously corrected by time stamps arriving from source device 401, by referencing the time stamps against the sink network clock.

As another example, while series of blocks have been described with respect to FIGS. 8A-8B, 9A-9B, 10A-10B, 11A-11B, and 12A-12B, the order of the blocks may be modified in other implementations. Further, non-dependent blocks may be performed in parallel.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A system, comprising:
a source communication device comprising:
a memory to store instructions; and
a processor configured to:
estimate a difference in sampling rate between a source streaming clock and a sink streaming clock, where the source streaming clock is associated with processing of audio or video data in the source communication device, and where the sink streaming clock is associated with processing of audio or video data in a sink communication device;
estimate a drift between the source streaming clock and the sink streaming clock based on the estimated difference in sampling rate between the source streaming clock and the sink streaming clock;
set a time stamp interval associated with a source network clock that controls timing of communication in a network comprising the source communication device and the sink communication device, where the time stamp interval is based on the estimated drift between the source streaming clock and the sink streaming clock;
detect whether a condition to generate a time stamp is satisfied, the condition being based on the time stamp interval associated with the source network clock; and
in response to detecting the condition to generate the time stamp is satisfied:
generate, using a time stamp generator, a time stamp that includes a source network clock value derived from the source network clock and a source streaming clock value derived from the source streaming clock; and incorporate the time stamp into a data unit using a time stamp insertion mechanism; and
a communication interface to transmit the data unit to one of the other devices in the network.

2. The system of claim 1, where the processor is to further implement:
a sink signal analyzer to receive information from the sink communication device and to activate the time stamp generator based on the received information.

3. The system of claim 2, where the sink signal analyzer receives a sink time stamp from the sink communication device and where the time stamp generator generates a virtual time stamp based on the received sink time stamp.

4. The system of claim 1, where the time stamp mechanism is to extrapolate the time stamp based on a future source network clock value.

5. The system of claim 1, where the time stamp mechanism is to provide, in the time stamp, an indication of when a subsequent time stamp will be generated.

6. The system of claim 1, further comprising:
the sink communication device comprising:
a memory to store instructions; and
a processor to execute the instructions to implement:
a sink network clock synchronized with the source network clock;
the sink streaming clock; and
a sink time stamp mechanism to:
receive the time stamp from the source communication device;
compare a sink streaming clock value derived from the sink streaming clock with the source streaming clock value included in the time stamp; and
adjust the sink streaming clock based on the comparison.

7. The system of claim 6, further comprising:
a derivation mechanism to derive the sink streaming clock from the sink network clock by implementing a multiplication factor, and where the sink time stamp mechanism adjusts the derivation mechanism by adjusting the multiplication factor based on the comparison of the sink streaming clock value with the source streaming clock value.

8. The system of claim 6, where the sink time stamp mechanism is further to:
receive, from the source device, an indication of when a next time stamp will be generated; and
generate a sink time stamp based on the received indication.

9. The system of claim 6, where the sink time stamp mechanism is further to:
generate sink time stamps at particular intervals.

10. The system of claim 6, where the network comprises a Bluetooth piconet, where the source network clock and the sink network clock comprise a Bluetooth piconet clock, and where the source streaming clock and the sink streaming clock comprise a pulse code modulation (PCM) clock.

11. A method comprising:
estimating a difference in sampling rate between a source streaming clock and a sink streaming clock, where the source streaming clock is associated with processing of audio or video data in a source communication device, and where the sink streaming clock is associated with processing of audio or video data in a sink communication device;
estimating a drift between the source streaming clock and the sink streaming clock based on the estimated difference in sampling rate between the source streaming clock and the sink streaming clock;
setting a time stamp interval associated with a source network clock that controls timing of communication in a network comprising the source communication device and the sink communication device, where the time stamp interval is based on the estimated drift between the source streaming clock and the sink streaming clock;
detecting whether a condition to generate a time stamp is satisfied, the condition being based on the time stamp interval associated with the source network clock; and
in response to detecting the condition to generate the time stamp is satisfied:
recording, using a baseband controller of the source communication device, a source network clock value associated with the source network clock;
recording, using the baseband controller, a source streaming clock value associated with the source streaming clock;
generating, using the baseband controller, a time stamp that includes the source network clock value and the source streaming clock value; and
sending, using the baseband controller, the time stamp to the sink communication device.

12. The method of claim 11, where the generating comprises extrapolating the source network clock value and the source streaming clock value based on a future source network clock value, where the extrapolating comprises:
determining a current source network clock value;
determining a current source streaming clock value;
determining a multiplication factor based on the current source network clock value and the current source streaming clock value; and determining, based on the multiplication factor, a future source streaming clock value associated with the future source network clock value.

13. The method of claim 11, where the generating comprises including, in the time stamp, an indication of when a subsequent time stamp will be generated in the future.

14. The method of claim 11, where the generating comprises receiving, from the sink communication device, a sink time stamp and generating a virtual time stamp based on the received sink time stamp.

15. The method of claim 11, further comprising:
receiving, using a baseband controller of the sink communication device, the time stamp;
comparing, using the baseband controller of the sink communication device, the source streaming clock value with a sink streaming clock value associated with the sink streaming clock; and
adjusting, using the baseband controller of the sink communication device, the sink streaming clock based on a result of the comparison.

16. The method of claim 15, where the comparing comprises:
detecting that a sink network clock reached a value matching the source network clock value included in the time stamp; and
in response to the detecting, comparing the source streaming clock value included in the time stamp with the sink streaming clock value.

17. The method of claim 15, where the comparing comprises:
retrieving a sink time stamp that includes a sink network clock value matching the source network clock value, where the sink time stamp includes the sink streaming clock value.

18. The method of claim 15, where the adjusting comprises adjusting a multiplication factor used to derive the sink streaming clock from a sink network clock based on a result of the comparison.

19. The method of claim 15, further comprising:
monitoring a buffer associated with output of audio or video data; and
sending a sink signal to the source communication device, where the sink signal includes information about the status of the buffer.

20. A system comprising:
a source communication device comprising a first memory device containing instructions executable by a first processor, the first memory device comprising:
one or more instructions to estimate a difference in sampling rate between a source streaming clock and a sink streaming clock, where the source streaming clock is associated with processing of audio or video data in the source communication device, and where the sink streaming clock is associated with processing of audio or video data in a sink communication device;
one or more instructions to estimate a drift between the source streaming clock and the sink streaming clock based on the estimated difference in sampling rate between the source streaming clock and the sink streaming clock;
one or more instructions to set a time stamp interval associated with a source network clock that controls timing of communication in a network comprising the source communication device and the sink communication device, where the time stamp interval is based on the estimated drift between the source streaming clock and the sink streaming clock;
one or more instructions to detect whether a condition to generate a time stamp is satisfied, the condition being based on the time stamp interval associated with the source network clock; and
in response to detecting the condition to generate the time stamp is satisfied:
one or more instructions to generate a time stamp that includes a source network clock value derived from the source network clock and a source streaming clock value derived from the source streaming clock; and
one or more instructions to incorporate the time stamp into a data unit and transmit the data unit to one of the other devices in the network; and
the sink communication device comprising a second memory device containing instructions executable by a second processor, the second memory device comprising:
one or more instructions to provide a sink network clock synchronized with the source network clock;
one or more instructions to provide the sink streaming clock
one or more instructions to receive the data unit and extract the time stamp from the data unit;
one or more instructions to compare a sink streaming clock value to the source streaming clock value; and
one or more instructions to adjust the sink streaming clock based on the comparison.

* * * * *